(12) United States Patent
Cheng et al.

(10) Patent No.: US 12,430,573 B2
(45) Date of Patent: Sep. 30, 2025

(54) SUBJECT-AWARE CONTRASTIVE LEARNING FOR BIOSIGNALS

(71) Applicant: Apple Inc., Cupertino, CA (US)

(72) Inventors: Joseph Y. Cheng, Santa Clara, CA (US); Erdrin Azemi, San Mateo, CA (US); Hanlin Goh, Sunnyvale, CA (US); Kaan E. Dogrusoz, Santa Clara, CA (US); Cuneyt O. Tuzel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1137 days.

(21) Appl. No.: 17/326,098

(22) Filed: May 20, 2021

(65) Prior Publication Data

US 2021/0374570 A1     Dec. 2, 2021

Related U.S. Application Data

(60) Provisional application No. 63/029,945, filed on May 26, 2020.

(51) Int. Cl.
*G06N 5/04*       (2023.01)
*G06N 20/00*    (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 10,839,013 B1* | 11/2020 | Werris | G06F 40/216 |
| 11,769,110 B1* | 9/2023 | Bourke | G06Q 10/0631 |
| | | | 705/28 |
| 2018/0218256 A1* | 8/2018 | Raviv | G06N 3/045 |
| 2021/0049628 A1* | 2/2021 | Baird | G06N 3/045 |
| 2021/0233615 A1* | 7/2021 | Banavar | G16H 40/67 |
| 2021/0295091 A1* | 9/2021 | Li | G06F 18/23213 |
| 2021/0334645 A1* | 10/2021 | Pardeshi | G10L 25/51 |
| 2021/0358177 A1* | 11/2021 | Park | G06N 3/045 |
| 2022/0139070 A1* | 5/2022 | Okamoto | G08G 1/0116 |
| | | | 382/159 |
| 2022/0198356 A1* | 6/2022 | Gabale | G06N 3/08 |

OTHER PUBLICATIONS

Hadsell et al., "Dimensionality Reduction by Learning an Invariant Mapping." Nov. 2005, 8 pages.
Chen et al., A Simple Framework for Contrastive Learning of Visual Representations. arXiv:2002.05709 [cs, stat], Feb. 2020, 17 pages.
Cui et al., Class-Balanced Loss Based on Effective Number of Samples. In 2019 IEEE/CVF Conference on Computer Vision and Pattern Recognition (CVPR), Long Beach, CA, Jun. 2019, pp. 9260-9269.

(Continued)

*Primary Examiner* — David E Choi
(74) *Attorney, Agent, or Firm* — Kilpatrick Townsend & Stockton LLP

(57) ABSTRACT

The present application relates to apparatus, systems, and methods to perform subject-aware self-supervised learning of a machine-learning model for classification of data, such as classification of biosignals.

17 Claims, 16 Drawing Sheets

(56) References Cited

OTHER PUBLICATIONS

P. de Chazal et al., Automatic Classification of Heartbeats Using ECG Morphology and Heartbeat Interval Features. IEEE Transactions on Biomedical Engineering, vol. 51, No. 7, Jul. 2004, pp. 1196-1206.

DeVries et al., Improved Regularization of Convolutional Neural Networks with Cutout. arXiv:1708.04552 [cs], Nov. 2017, 8 pages.

Doquire et al. Feature Selection for Interpatient Supervised Heart Beat Classification. Computational Intelligence and Neuroscience, 2011, pp. 1-9.

Garcia et al., Inter-Patient ECG Heartbeat Classification with Temporal VCG Optimized by PSO. Scientific Reports, vol. 7, No. 1, Dec. 2017, 11 pages.

He et al., Identity Mappings in Deep Residual Networks. In European Conference on Computer Vision, Jul. 2016, pp. 630-645.

Huang et al., A new hierarchical method for inter-patient heartbeat classification using random projections and RR intervals. BioMedical Engineering OnLine, vol. 13, No. 1, 2014, p. 90.

Ioffe et al., Batch Normalization: Accelerating Deep Network Training by Reducing Internal Covariate Shift. International Conference on Machine Learning, Mar. 2015. 9 pages.

Lin et al. Heartbeat Classification Using Normalized RR Intervals and Morphological Features. Mathematical Problems in Engineering, 2014, pp. 1-11.

Luo et al., Patient-Specific Deep Architectural Model for ECG Classification. Journal of Healthcare Engineering, 2017, pp. 1-13.

Niu et al., Inter-Patient ECG Classification with Symbolic Representations and Multi-Perspective Convolutional Neural Networks. IEEE Journal of Biomedical and Health Informatics, 2019, pp. 1321-1332.

Xu et al., Towards End-to-End ECG Classification With Raw Signal Extraction and Deep Neural Networks. IEEE Journal of Biomedical and Health Informatics, vol. 23, No. 4, Jul. 2019, pp. 1574-1584.

Yun et al., CutMix: Regularization Strategy to Train Strong Classifiers with Localizable Features. In International Conference on Computer Vision, Aug. 2019, pp. 6023-6032.

Zhang et al., "mixup: Beyond Empirical Risk Minimization. In International Conference on Learning Representations," Apr. 2018, 13 pages.

Acharya et al., "Automated EEG analysis of epilepsy: A review," Knowledge-Based Systems, vol. 45, Jun. 2013. pp. 147-165.

De Aguiar Neto et al., "Depression biomarkers using non-invasive EEG: A review," Neuroscience & Biobehavioral Reviews, vol. 105, Oct. 2019, pp. 83-93.

J. Healey et al., "Detecting Stress During Real-World Driving Tasks Using Physiological Sensors," IEEE Transactions on Intelligent Transportation Systems, vol. 6, Jun. 2005, pp. 156-166.

Misra et al., "Shuffle and Learn: Unsupervised Learning using Temporal Order Verification," European Conference on Computer Vision, Jul. 2016, 21 pages.

Wei et al., "Learning and Using the Arrow of Time," in 2018 IEEE/CVF Conference on Computer Vision and Pattern Recognition, (Salt Lake City, UT), Jun. 2018, pp. 8052-8060.

Oord et al., "Representation Learning with Contrastive Predictive Coding," arXiv:1807.03748 [cs, stat], Jan. 2019, 13 pages.

Doersch et al., "Multi-task Self-Supervised Visual Learning," 2017 IEEE International Conference on Computer Vision (ICCV), Oct. 2017, pp. 2070-2079.

Banville et al., "Self-supervised representation learning from electroencephalography signals," 2019 IEEE 29th International Workshop on Machine Learning for Signal Processing (MLSP), Nov. 2019, 6 pages.

Sarkar et al., "Self-supervised Learning for ECG-based Emotion Recognition," ICASSP 2020—2020 IEEE International Conference on Acoustics, Speech and Signal Processing (ICASSP), May 2020, pp. 3217-3221.

Wu et al., "Unsupervised Feature Learning via Non-Parametric Instance-level Discrimination," in Proceedings of the IEEE Conference on Computer Vision and Pattern Recognition, May 2018, pp. 3733-3742.

Sermanet et al., "Time-Contrastive Networks: Self-Supervised Learning from Video," arXiv:1704.06888 [cs], Mar. 2018, 15 pages.

He et al., "Momentum Contrast for Unsupervised Visual Representation Learning," arXiv:1911.05722 [cs], Nov. 2019, 11 pages.

Hyvärinen et al., "Unsupervised Feature Extraction by Time-Contrastive Learning and Nonlinear ICA," in Advances in Neural Information Processing Systems 29, 2016, 11 pages.

Tzeng et al., "Adversarial Discriminative Domain Adaptation," 2017 IEEE Conference on Computer Vision and Pattern Recognition (CVPR), IEEE, Jul. 2017, pp. 2962-2971.

Farshchian, et al., "Adversarial Domain Adaptation for Stable Brain-Machine Interfaces," International Conference on Learning Representations, 2019, 14 pages.

Tzeng et al., "Simultaneous Deep Transfer Across Domains and Tasks," in The IEEE International Conference on Computer Vision, 2015, pp. 4068-4076.

Xie et al., "Controllable Invariance through Adversarial Feature Learning," in Advances in Neural Information Processing Systems, 2017, 11 pages.

Ozdenizci et al., "Learning Invariant Representations From EEG via Adversarial Inference," IEEE Access, vol. 8, 2020, pp. 27074-27085.

Krell et al., "Rotational data augmentation for electroencephalographic data," in 2017 39th Annual International Conference of the IEEE Engineering in Medicine and Biology Society (EMBC), (Seogwipo), IEEE, Jul. 2017, pp. 471-474.

Gutmann et al., "Noise-contrastive estimation: A new estimation principle for unnormalized statistical models," in International Conference on Artificial Intelligence and Statistics, (Sardinia, Italy), 2010, pp. 297-304.

Goodfellow et al., "Generative Adversarial Nets," in Advances in Neural Information Processing Systems 27, 2014, pp. 2672-2680.

Paszke et al., "Pytorch: An imperative style, high-performance deep learning library," in Advances in Neural Information Processing Systems 32, Curran Associates, Inc., 2019, pp. 8026-8037.

Kingma, et al., "Adam: A Method for Stochastic Optimization," International Conference for Learning Representations, Jan. 2015, 9 pages.

Goldberger et al., "PhysioBank, PhysioToolkit, and PhysioNet: Components of a New Research Resource for Complex Physiologic Signals," Circulation, vol. 101, Jun. 2000, 6 pages.

Schalk et al., "BCI2000: A General-Purpose Brain-Computer Interface (BCI) System," IEEE Transactions on Biomedical Engineering, vol. 51, Jun. 2004, pp. 1034-1043.

Kim et al., "Motor Imagery Classification Using Mu and Beta Rhythms of EEG with Strong Uncorrelating Transform Based Complex Common Spatial Patterns," Computational Intelligence and Neuroscience, vol. 2016, 2016, pp. 1-13.

Dose et al., "A Deep Learning MI—EEG Classification Model for BCIs," in 2018 26th European Signal Processing Conference (EUSIPCO), (Rome), IEEE, Sep. 2018, pp. 1676-1679.

Moody et al., "The impact of the MIT-BIH Arrhythmia Database," IEEE Engineering in Medicine and Biology Magazine, vol. 20, Jun. 2001, pp. 45-50.

Dash et al., "Automatic Real Time Detection of Atrial Fibrillation," Annals of Biomedical Engineering, vol. 37, Sep. 2009, pp. 1701-1709.

Bruun et al., "Automatic Atrial Fibrillation detection: A novel approach using discrete wavelet transform and heart rate variability," in 2017 39th Annual International Conference of the IEEE Engineering in Medicine and Biology Society (EMBC), (Seogwipo), IEEE, Jul. 2017, pp. 3981-3984.

Wu et al., "A Deep Learning Method to Detect Atrial Fibrillation Based on Continuous Wavelet Transform," in 2019 41st Annual International Conference of the IEEE Engineering in Medicine and Biology Society (EMBC), (Berlin, Germany), IEEE, Jul. 2019, pp. 1908-1912.

PhysioNet, MIT-BIH Arrhythmia Database, Located at https://physionet.org/content/mitdb/1.0.0/, 2005, 62 pages.

(56) References Cited

OTHER PUBLICATIONS

Tian et al., Contrastive multiview coding, arXiv:1906.05849v5, Dec. 18, 2020, 16 pages.
Tian et al., What makes for good views for contrastive learning?, arXiv:2005.10243v3, Dec. 18, 2020, 24 pages.
Xiao et al., What Should Not Be Contrastive in Contrastive Learning, arXiv:2008.05659v2, Mar. 18, 2021, 13 pages.

* cited by examiner

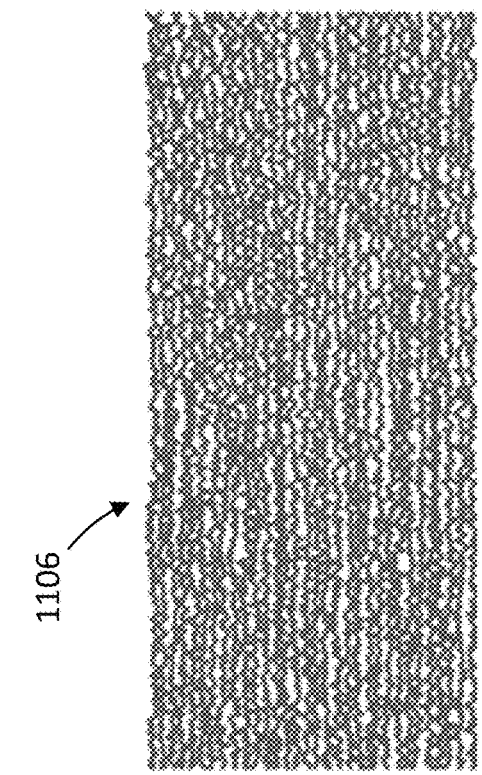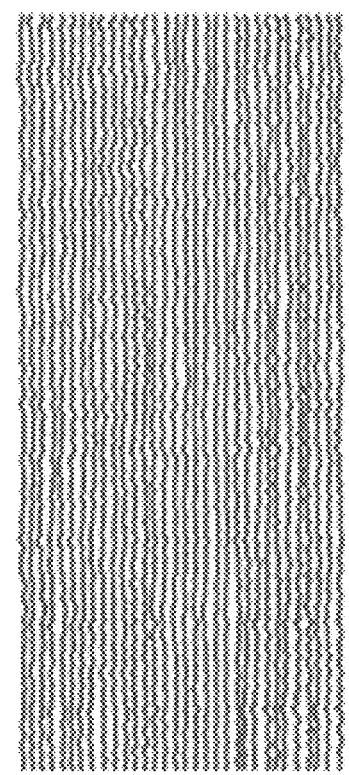
FIG. 11
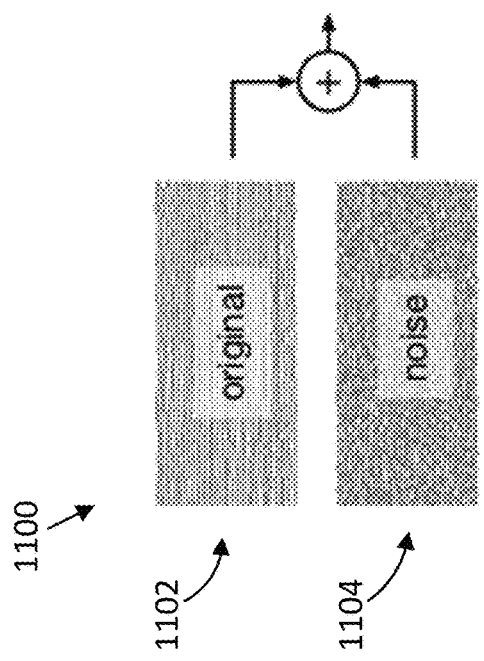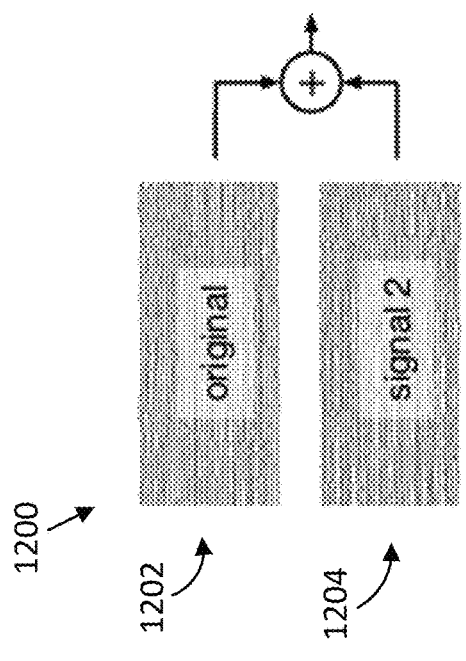
FIG. 12

2100 → FIG. 21

| | Intersubject [a] 2114 | | Intrasubject [b] 2116 |
|---|---|---|---|
| | 2 class[a] | 4 class[b] | 4 class[b] |
| 2102 → 1st Legacy Approach | 80.1 | - | - |
| 2104 → 2nd Legacy Approach | 80.1 | - | - |
| 2106 → End-to-end (ours) | 81.0±0.9 | 50.6±1.0 | 44.0±1.6 |
| *Fine-tuned from:* | | | |
| 2108 → Baseline SSL | 81.1±0.6 | 52.6±0.7 | 50.8±1.4 |
| 2110 → Subject-specific | 81.6±0.8 | 53.9±0.4 | 50.5±1.6 |
| 2112 → Subject-invariant | 81.2±0.9 | 52.8±0.8 | 49.8±1.5 |

[a] 2 class: right fist and left fist; [b] 4 class: right fist, left fist, both fists, and both feet.

2200 → FIG. 22

| | Beat 2210 | | | Rhythm 2212 | | Subject 2214 |
|---|---|---|---|---|---|---|
| | Overall Bal Acc | SVEB F1 | VEB F1 | Overall Bal Acc | AFib F1 | ID Acc |
| 2202 → No augmentation | 47.9±3.8 | 6.9±2.0 | 34.1±3.4 | 38.0±1.5 | 41.5±4.3 | 67.5±1.8 |
| 2204 → Baseline SSL | 66.3±6.2 | 26.7±8.3 | 56.1±8.3 | 49.4±3.4 | 39.7±6.1 | 84.7±0.6 |
| 2206 → Subject-specific | 65.1±6.1 | 20.9±7.7 | 57.4±5.9 | 46.0±3.7 | 39.4±5.3 | 81.6±0.8 |
| 2208 → Subject-invariant | | | | | | |
| λ = 1.0 | 64.3±7.9 | 18.7±8.5 | 59.9±9.2 | 49.7±3.3 | 42.9±8.4 | 76.1±2.2 |
| λ = 0.1 | 68.6±6.0 | 26.5±8.1 | 62.9±10.9 | 51.0±4.4 | 44.8±7.9 | 79.0±0.9 |
| λ = 0.01 | 69.8±5.5 | 23.9±8.4 | 64.1±8.5 | 52.3±5.9 | 44.6±5.8 | 82.9±0.9 |
| λ = 0.001 | 63.5±4.4 | 19.7±5.3 | 62.0±8.0 | 52.4±4.3 | 39.8±6.1 | 83.7±0.9 |
| Random encoder | 54.9±3.8 | 5.6±0.9 | 61.5±11.3 | 37.0±2.0 | 40.7±2.8 | 41.4±3.5 |

SUBJECT-AWARE CONTRASTIVE LEARNING FOR BIOSIGNALS

CROSS-REFERENCE TO RELATED APPLICATION

This application is claims priority to U.S. Provisional Application Ser. No. 63/029,945 filed May 26, 2020 entitled "SUBJECT-AWARE CONTRASTIVE LEARNING FOR BIOSIGNALS," which is incorporated herein by reference in its entirety.

BACKGROUND

As computer technology has developed, computing devices have been found to be useful for making determinations and/or predictions off the data collected by the computers and other computing devices. This has resulted in the computing devices collecting massive amounts of data to be utilized for determinations and/or predictions. To properly utilize the massive amounts of data, it has become paramount to classify the data into different groups for processing. Due to the massive amounts of data, human classification of the data became unwieldy and techniques for the computing devices to classify the data into groups has developed.

BRIEF DESCRIPTION OF DRAWINGS

FIG. 11 illustrates an example noise introduction representation in accordance with some embodiments.

FIG. 12 illustrates an example signal mixing representation in accordance with some embodiments.

FIG. 21 illustrates an electroencephalogram (EEG) classification accuracy table for different classification approaches.

FIG. 22 illustrates an electrocardiogram (ECG) classification accuracy table for different classification approaches.

DETAILED DESCRIPTION

Figure 1:
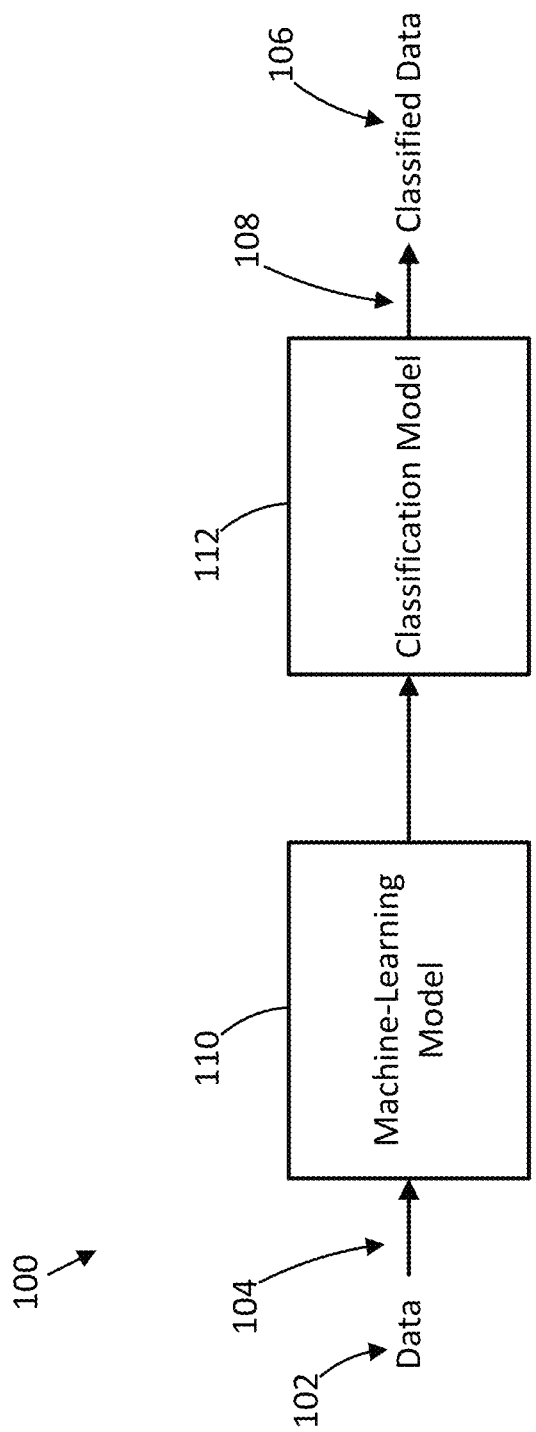
FIG. 1 illustrates an example system for signal classification in accordance with some embodiments.

Herein disclosed are methods, machine-learning models, computer-program products, and other approaches for classifying data by self-supervised learning of the computing devices. The approaches described herein may improve accuracy, sensitivity, and/or positive predictability of data classification as compared to legacy approaches. The approaches may be applied to biosignals (such as electroencephalogram (EEG) signals, electrocardiogram (ECG) signals, electromyogram (EMG) signals, electrooculography (EOG), magnetoencephalogram (MEG) signals, functional near-infrared spectroscopy (fNIRS) signals and/or other bioelectrical signals) and may be utilized for classifying the biosignals into different groups. For example, the approaches may classify the biosignals, or portions thereof, into groups by an action or actions (such as moving and/or clenching hands or feet) performed by a subject or biological features (such as biological features related to imagination of moving a body part, a stress level, a level of mental exertion, a sleep state, a level of enjoyment, and/or a type of noise heard, and/or physical supraventricular ectopic beats (SVEBs), ventricular ectopic beats (VEBs), atrial fibrillation (AFib), heartbeat abnormality, and/or a type of heartbeat abnormality) of a subject. The approaches may be subject dependent, which may lead to the improvement in accuracy, sensitivity, and/or positive predictability of the data classification.

Biosignal classification can lead to better diagnosis and understanding of our bodies and well-being. For example, medical experts can monitor health conditions, such as epilepsy or depression, using brain EEG data. In addition, ECG give insight to cardiac health and can also indicate stress.

Time-series biosignals can be non-invasively and continuously measured. However, labeling these high-dimensional signals is a labor-intensive and time-consuming process, and assigning labels may introduce unintended biases. Moreover, these signals are impacted by noise from various sources including differences between subjects, other biological processes, and sensor noise. Distinguishing between noise and relevant signal is a challenging task. Herein disclosed are some approaches to apply self-supervised learning methods to extract meaningful representations from these high-dimensional noisy signals without the need for labels. Some goals of these approaches are (1) to demonstrate the feasibility of using contrastive learning to learn representations for biosignals and (2) to improve the quality of these representations when subject variability is a concern.

The following approaches may include: 1) applying self-supervised learning to biosignals, 2) developing data augmentation techniques for biosignals, and 3) integrating subject awareness into the self-supervised learning framework.

Speech and vision data are processed by the human senses of hearing and sight. Whereas, biosignals can be the result of processing this information along with other complex biological mechanisms. Information may be obscured or lost when measuring the resulting time-series signals. The same techniques used to learn representations for the language and vision domains may not be effective for biosignals. For language and vision, deep expertise enables the use of strong priors to facilitate learning, such as phoneme segmentation and acoustic dynamics for speech; analogous priors are not readily available for the biosignal domain. The approaches described herein demonstrate the effectiveness of contrastive loss for self-supervised learning for biosignals. This approach includes the development and assessment of augmentation techniques and the consideration of inter-subject variability, which is the signal variations from subject to subject.

Data transformation algorithms help increase the information content in the learned embeddings for desired downstream tasks. Domain-inspired augmentation techniques are developed herein. For example, the power in certain EEG frequency bands has been shown to be highly correlated with different brain activities. Frequency-based perturbations may be used to augment the signal. As described herein, temporal specific transformations (cutout and delay) may be the most effective transformations for representation learning followed by signal mixing, sensor perturbations (dropout and cutout), and bandstop filtering.

Inter-subject variability poses a challenge when performing data-driven learning with a small number of subjects. Subject-specific features are an integral part of biosignals, and the knowledge that the biosignals are from different subjects is a "free" label. Two approaches are disclosed to integrate this feature with self-supervised learning: (1) using subject-specific distributions to compute the contrastive loss, and (2) promoting subject invariance through adversarial training. Experimental results show that promoting subject invariance increases classification performance when training with a small number of subjects. Both approaches yield weight initializations that are effective in fine-tuning with supervised labels.

FIG. 1 illustrates an example system 100 for signal classification in accordance with some embodiments. The system 100 may be utilized for classification of data, such as biological signals. For example, the system 100 may receive data 102 at an input of the system 100 and output classified data 106 at an output 108 of the system 100. The system 100 may be implemented by a computing device, such as a computer, a server, or another type of computing device.

The system 100 may include a machine-learning model 110. The machine-learning model 110 may implement contrastive learning for training of the machine-learning model 110 to facilitate classification of the data 102 received at the input 104 of the system 100. For example, the machine-learning model 110 may implement subject-dependent, self-supervised learning to facilitate classification of the data 102. The training of the machine-learning model 110 via contrastive learning may reduce a number of downstream tasks for classifying the data 102.

In some embodiments, techniques are provided to train a machine-learning model (such as the machine-learning model 110) using a training data set that includes data elements corresponding to multiple subjects. While the training data set may correspond to multiple subjects, the machine-learning model may subsequently be used by a single subject (e.g., one of the multiple subjects or another subject not included in the multiple subjects). The machine-learning model may thus be trained in a manner that promotes accuracy for the specific use case despite the more general available training data set.

Training the machine-learning model can include training an encoder so as to be invariant to a transformation or augmentation that processes the input signals. An input signal may be multidimensional, may be generated based on data collected from multiple sensors and/or may include one or more biosignals. The input signal may include (for example) EEG, ECG, EMG, EOG, MEG, fNIRS, and/or other bioelectrical signals. The input signal may include an audio signal, a visual signal and/or other time series signals. The encoder can include a neural network, such as a residual neural network model, deep neural network model, feedforward neural network model, etc. The encoder may be configured to generate a multi-dimensional embedding vector (e.g., having over 50, over 100 or over 200 dimensions) for each of a set of segments of an input signal. Each segment may have a predefined length and/or predefined number of samples.

Transformations that may be implemented for the encoder can include implementing a temporal cutout (that replaces a continuous section of the signal with zeros), a temporal delay (that delays time-series data in time), noise introduction (that adds noise, such as independent and identically distributed Gaussian noise, to the signal), filtering (that filters out signal content at a frequency band using a particular type of filter, such as a bandstop filter), and/or signal mixing (that adds another time instance or other subject data to the signal to simulate correlated noise). For data for which signals are concurrently collected via multiple sensors (e.g., electrodes) positioned at different locations relative to a subject (e.g., EEG data), the transformations may include implementing a spatial rotation (that rotates the data in space), spatial shift (that shifts the data in space), sensor dropout (that replaces data from a subset of sensors with zeros), and/or sensor cutout (that replaces data from sensors in a small region of space with zeros). Parameters that are applied can include (for example) maximum time delay, temporal cutout, noise scale, bandstop width, mixing scale, sensor dropout and/or sensor cutout radius.

The machine-learning model may further include a classifier configured to receive the transformed representation of an input signal from the encoder and predict a label. A label may indicate (for example) a mental task (e.g., which body part a subject is imagining moving), a stress level, level of mental exertion, sleep state, physical activity, level of enjoyment (e.g., of a song), type of noise, whether a heartbeat abnormality has occurred, a type of heartbeat abnormality, and/or other labels that may produce a biological reaction of the subject.

In some instances, during training, a fully connected layer is used to train the encoder to transform input signals in a particular manner so as to affect subject-indicative information in the signal. The machine-learning model may include one or more encoders that transform an input into a transformed representation of the input. The fully connected layer may be configured within the model to receive an output from an encoder and assign the encoded signal to a class representing subject identity. Thus, the fully connected layer may predict whether the output corresponds to a given subject. In some instances, the given subject may pertain to a specific subject (e.g., a user of a device). In some instances, the machine-learning model includes multiple encoders, and the fully connected layer is configured to predict whether outputs from the multiple encoders correspond to a same subject. A first encoder may implement a transformation of a given signal associated with a given subject and then embed the transformed signal, and a second encoder may embed the original signal (or another un-transformed signal associated with the given subject).

The machine-learning model may be configured to impose higher losses when the adversarial identifier accurately predicts, based on a given embedded signal, a corresponding subject identifier and/or that the embedded signal and another embedded signal correspond to a same subject (e.g., particular or given subject). In this instance, the encoder may then be trained to learn predictive features that generally correspond to input-output relationships while reducing or minimizing learning features specific to specific subjects. The machine-learning model may alternatively be configured to learn predictive features that pertain to a particular user or that are predictive of subject identification.

In some instances, during training, a subject-specific input distribution is computed, which is used to determine a loss. In some instances, distributions and/or data sets from other subjects are not used while determining the results. In some instances, the machine-learning model is configured to include multiple encoders to receive and encode (e.g., using one or more transformations) multiple input data elements. A loss function may include a contrastive loss function.

A model that is trained using the adversarial identifier and/or using subject-specific distributions for loss calculations can reduce an extent to which the model learns subject-specific features. Particularly when relatively small training data sets are used, learning subject-specific features may result in poorer general performance of the model, in that the model's accuracy may be reduced when processing signals corresponding to a new subject (not represented in the data). Thus, techniques presented herein may facilitate training a general model that may be used to process data from new subjects. In some instances, the trained model may serve as an initialized model that may then be further trained (e.g., to learn features that are specific to a given user). For example, the initialized model may be stored in data storage on a new device, and the new device may then further train the model based on signals collected from a user. As another example, the initialized model may be used when a user has recently created an account with a service.

The system 100 may further include a classification model 112, which may be referred to as downstream learning. The classification model 112 may be coupled to the machine-learning model 110 and may receive an output of the machine-learning model 110. For example, the classification model 112 may receive signals output by the machine-learning model 110 and may classify the signals, or portions thereof, into groups. In some embodiments, the signals may comprise biosignals and the classification model may classify the biosignals into groups by an action or actions (such as moving and/or clenching hands or feet) performed by a subject or biological features (such as biological features related to imagination of moving a body part, a stress level, a level of mental exertion, a sleep state, a level of enjoyment, and/or a type of noise heard, and/or physical supraventricular ectopic beats (SVEBs), ventricular ectopic beats (VEBs), atrial fibrillation (AFib), heartbeat abnormality, and/or a type of heartbeat abnormality) of a subject. The classified signals may be output at the output 108 of the system 100 as the classified data 106.

Figure 2:
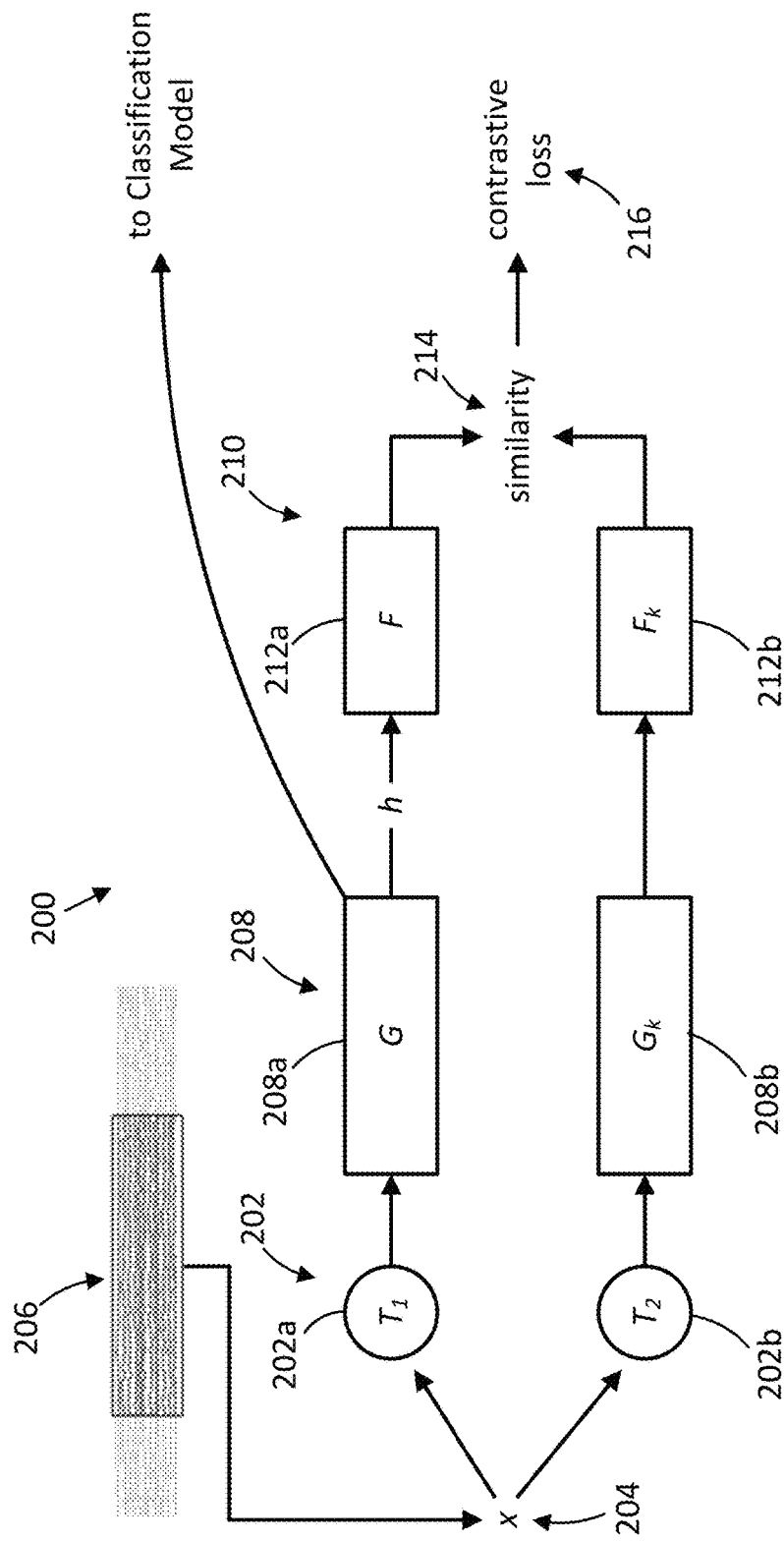
FIG. 2 illustrates an example machine-learning model in accordance with some embodiments.

FIG. 2 illustrates an example machine-learning model 200 in accordance with some embodiments. The machine-learning model 200 may be implemented as the machine-learning model 110 (FIG. 1). The machine-learning model 200 may receive signals as input and be trained with a portion of the signals. The machine-learning model 200 may further output signals for further classification by a classification model (such as the classification model 112 (FIG. 1)).

The machine-learning model 200 may include two or more transformation elements 202. For example, the machine-learning model 200 includes a first transformation element 202a and a second transformation element 202b in the illustrated embodiments. The transformation elements 202 may be coupled to an input 204 of the machine-learning model 200, and each of the transformation elements 202 may receive signals applied to the input 204 of the machine-learning model 200. For example, the transformation elements 202 may receive signal 206 in the illustrated embodiment. The signal 206 may comprise a multi-channel signal as illustrated.

The transformation elements 202 may apply different transformations to the signal 206 received on the input 204 of the machine-learning model 200. For example, the first transformation element 202a may apply a first transformation to the signal 206 and the second transformation element 202b may apply a second transformation to the signal 206, the second transformation being different than the first transformation. In some embodiments, the second transformation element 202b may apply one or more perturbations, such as temporal cutout, temporal delay, noise, filtering, signal mixing, spatial rotation, spatial shifting, sensor dropout, and/or sensor cutout, that is not applied to the signal 206 by the first transformation element 202a. Accordingly, a first transformed signal output by the first transformation element 202a may differ from a second transformed signal output by the second transformation element 202b, although the first transformed signal and the second transformed signal are both based on the signal 206.

The machine-learning model 200 may further include two or more encoders 208. For example, the machine-learning model 200 includes a first encoder 208a and a second encoder 208b in the illustrated embodiment. Each of the encoders 208 may correspond to a transformation element of the transformation elements 202, such that an encoder of the encoders 208 receives a signal output by a corresponding transformation element of the transformation elements 202. For example, the first encoder 208a corresponds to the first transformation element 202a and receives a signal output by the first transformation element 202a in the illustrated embodiment. Further, the second encoder 208b corresponds to the second transformation element 202b and receives a signal output by the second transformation element 202b in the illustrated embodiment. The encoders 208 may have a one-to-one ratio with the transformation elements 202, such that the machine-learning model 200 includes a same number of encoders 208 as transformation elements.

The encoders 208 may encode signals received by the encoders 208. The encoders 208 may be trained, where the encoding being performed by the encoders 208 may be the same or may be different based on the training. For example, the first encoder 208a and the second encoder 208b may utilize the same or different encoding algorithms for encoding the signals received by the first encoder 208a and the second encoder 208b from the first transformation element 202a and the second transformation element 202b, respectively. One or more of the encoders 208 may implement momentum in the encoding in some embodiments. For example, the one or more of the encoders 208 may have an encoding algorithm being applied by the encoder updated by the training slower than the encoding algorithm of the other encoders. For example, the second encoder 208b may implement momentum in the illustrated embodiment, where the encoding algorithm of the second encoder 208b is being updated slower by the training than the updating of the encoding algorithm of the first encoder 208a.

One or more of the encoders 208 may be coupled to a classification model (such as the classification model 112 (FIG. 1)) and may provide an encoded signal or signals to the classification model. For example, the first encoder 208a may be coupled to the classification model in the illustrated embodiment and provide the encoded signal to the classification model.

The machine-learning model 200 may further include a fully connected layer 210. The fully connected layer 210 may be coupled to the output of the encoders 208. The fully connected layer 210 may include one or more functional blocks. For example, the fully connected layer 210 includes a first functional block 212a and a second functional block 212b in the illustrated embodiment. Each functional block of the fully connected layer 210 may be coupled to a corresponding encoder of the encoders 208 and may receive the signal output by the corresponding encoder. For example, the first functional block 212a corresponds to the first encoder 208a and receives the signal output by the first encoder 208a in the illustrated embodiment. Further, the second functional block 212b corresponds to the second encoder 208b and receives the signal output by the second encoder 208b.

The functional blocks may apply functions to signals received by the functional blocks. The functional blocks may be trained, where the functions being applied by the functional blocks may be the same or may be different based on the training. For example, the first functional block 212a and the second functional block 212b may apply the same or different functions to the signals received by the first functional block 212a and the second functional block 212b from the first encoder 208a and the second encoder 208b, respectively. One or more of the functional blocks may implement momentum in the functions in some embodiments. For example, the one or more of the functional blocks may have functions being applied by the functional block updated by the training slower than the functions of the other functional blocks. For example, the second functional block 212b may implement momentum in the illustrated embodiment, where the function of the second functional block 212b is being updated slower by the training than the updating of the function of the first functional block 212a.

The fully connected layer 210 may combine the signals output by the functional blocks to produce a similarity 214. For example, the fully connected layer 210 may combine the signal output by the first functional block 212a and the signal output by the second functional block 212b to produce the similarity 214 in the illustrated embodiment. The similarity 214 may indicate an amount of similarity between the signals output by the first functional block 212a and the second functional block 212b. The fully connected layer 210 may apply a dot product or a cosine to the signals output by the functional blocks to produce the similarity 214. The fully connected layer 210 may determine contrastive loss 216 from the similarity 214. For example, the fully connected layer 210 may treat distances of vectors of positive examples and distances of vectors of negative examples as output probabilities and utilize cross entropy loss to produce the contrastive loss 216. Subject information may be incorporated in the negative sampling procedure when producing the contrastive loss 216. In some embodiments, the contrastive loss 216 may focus on the loss on differences in time for a single subject rather than differences between subject. The approach of the contrastive loss 216 focusing on the difference in time for a single subject may be referred to as subject-specific self-supervised learning, and hence the approach may be subject dependent.

The contrastive loss 216 may be utilized for training of the encoders 208 and/or the functional blocks of the fully connected layer 210. For example, the encoding algorithms utilized by the encoders 208 and/or the functions applied by the functional blocks of the fully connected layer 210 may be trained (ex., modified and/or adapted) to reduce distances between similar inputs to the machine-learning model 200 for the contrastive loss 216 and increase distances between dissimilar inputs to the machine-learning model 200 for the contrastive loss 216. In particular, if the signal 206 is similar to another signal processed by the machine-learning model 200 during a training session, the encoding algorithms and/or the functions may be trained to have a distance between a representation of the signal 206 and a representation of the other signal produced by the encoders 208 and the fully connected layer 210 closer together. If the signal 206 is dissimilar to another signal processed by the machine-learning model 200 during a training session, the encoding algorithms and/or the functions may be trained to have a distance between a representation of the signal 206 and a representation of the signal produced by the encoders 208 and the fully connected layer 210 farther apart. In some instances, the distances between the similar inputs and the dissimilar inputs may be Euclidean distances.

The signals applied to the machine-learning model 200 during a training session may be associated with a single subject in some embodiments. For example, signals (such as the signal 206) applied to the machine-learning model 200 during the training session may be produced by one or more sensors sensing characteristics (such as biological characteristics) of a subject. The sensors may produce electrical signals representing the characteristics of the subject to be processed by the machine-learning model 200 for training. The signals may comprise EEG signals, ECG signals, EMG signals, MEG signals, fNIRS signals, and/or other bioelectrical signals that can be produced by sensors sensing characteristics of the subject. The signals may be included in a training data set. For example, a training data set that may be accessed during a training session may include multiple training elements. Each of the training elements may include one or more signals. The signals may be utilized for training the machine-learning model 200 during the training session, where having the signals associated with the single subject for the training may be referred to as subject-specific self-supervised learning.

Figure 3:
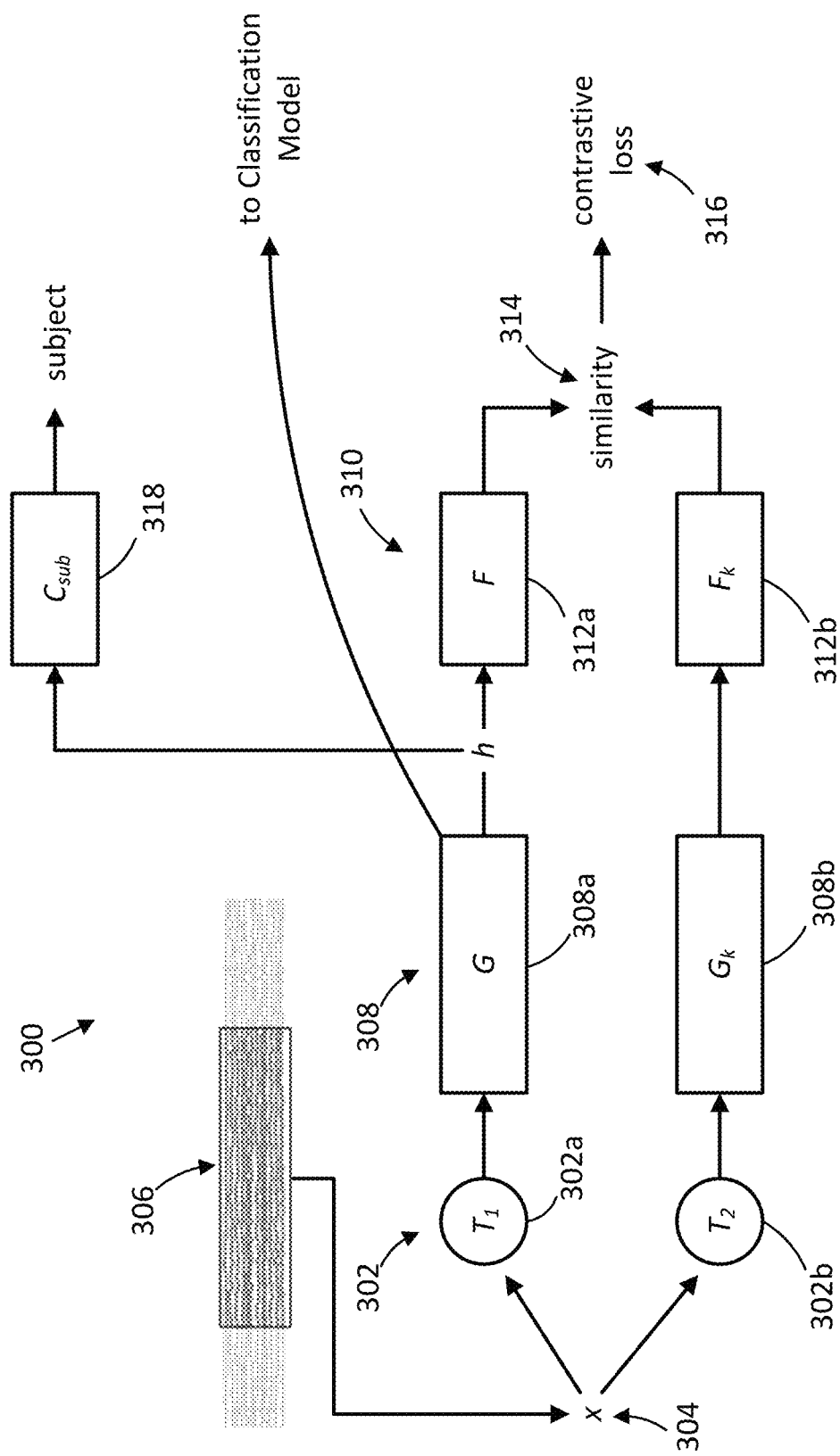
FIG. 3 illustrates another example machine-learning model in accordance with some embodiments.

FIG. 3 illustrates another example machine-learning model 300 in accordance with some embodiments. The machine-learning model 300 may be implemented as the machine-learning model 110 (FIG. 1). The machine-learning model 300 may receive signals as input and be trained with a portion of the signals. The machine-learning model 300 may further output signals for further classification by a classification model (such as the classification model 112 (FIG. 1)).

The machine-learning model 300 may include two or more transformation elements 302. For example, the machine-learning model 200 includes a first transformation element 202a and a second transformation element 202b in the illustrated embodiments. The two or more transformation elements 302 may include one or more of the features of the two or more transformation elements 202 (FIG. 2). The transformation elements 302 may be coupled to an input 304 of the machine-learning model 300, and each of the transformation elements 302 may receive signals applied to the input 304 of the machine-learning model 300. For example, the transformation elements 302 may receive signal 306 in the illustrated embodiment. The signal 306 may comprise a multi-channel signal as illustrated.

The transformation elements 302 may apply different transformations to the signal 306 received on the input 304 of the machine-learning model 300. For example, the first transformation element 302a may apply a first transformation to the signal 306 and the second transformation element 302b may apply a second transformation to the signal 306, the second transformation being different than the first transformation. In some embodiments, the second transformation element 302b may apply one or more perturbations, such as temporal cutout, temporal delay, noise, filtering, signal mixing, spatial rotation, spatial shifting, sensor dropout, and/or sensor cutout, that is not applied to the signal 306 by the first transformation element 302a. Accordingly, a first transformed signal output by the first transformation element 302a may differ from a second transformed signal output by the second transformation element 302b, although the first transformed signal and the second transformed signal are both based on the signal 306.

The machine-learning model 300 may further include two or more encoders 308. For example, the machine-learning model 300 includes a first encoder 308a and a second encoder 308b in the illustrated embodiment. The two or more encoders 308 may include one or more of the features of the encoders 208 (FIG. 2). Each of the encoders 308 may correspond to a transformation element of the transformation elements 302, such that an encoder of the encoders 308 receives a signal output by a corresponding transformation element of the transformation elements 302. For example, the first encoder 308a corresponds to the first transformation element 302a and receives a signal output by the first transformation element 302a in the illustrated embodiment. Further, the second encoder 308b corresponds to the second transformation element 302b and receives a signal output by the second transformation element 302b in the illustrated embodiment. The encoders 308 may have a one-to-one ratio with the transformation elements 302, such that the machine-learning model 300 includes a same number of encoders 308 as transformation elements.

The encoders 308 may encode signals received by the encoders 308. The encoders 308 may be trained, where the encoding being performed by the encoders 308 may be the same or may be different based on the training. For example, the first encoder 308a and the second encoder 308b may utilize the same or different encoding algorithms for encoding the signals received by the first encoder 308a and the second encoder 308b from the first transformation element 302a and the second transformation element 302b, respectively. One or more of the encoders 308 may implement momentum in the encoding in some embodiments. For example, the one or more of the encoders 308 may have an encoding algorithm being applied by the encoder updated by the training slower than the encoding algorithm of the other encoders. For example, the second encoder 308b may implement momentum in the illustrated embodiment, where the encoding algorithm of the second encoder 308b is being updated slower by the training than the updating of the encoding algorithm of the first encoder 308a.

One or more of the encoders 308 may be coupled to a classification model (such as the classification model 112 (FIG. 1)) and may provide an encoded signal or signals to the classification model. For example, the first encoder 308a may be coupled to the classification model in the illustrated embodiment and provide the encoded signal to the classification model.

The machine-learning model 300 may further include an adversarial identifier 318, which also may be referred to as a classifier. The adversarial identifier 318 may be coupled to an output of one or more of the encoders 308 and may receive encoded signals output by the one or more of the encoders 308. For example, the adversarial identifier 318 is coupled to the output of the first encoder 308a and receives encoded signals output by the first encoder 308a in the illustrated embodiment.

The adversarial identifier 318 may predict a subject associated with an encoded signal received from the first encoder 308a. For example, the adversarial identifier 318 may identify subject information represented by the encoded signal and predict a subject that produced the signal based on the subject information. The subject information may include information that is unique to the subject or unique to a group of subjects, such as an irregular heartbeat, unique heart function, unique brain function, or other unique characteristics that differ from that which is uniform (or expected to be uniform) for all subjects. The subject information may be represented by additional peaks, missing peaks, differing amplitudes, differing frequencies, or other differences from a signal which is uniform (or expected to be uniform) for all subjects. The adversarial identifier 318 may further remove the subject information from the encoded signal. For example, the adversarial identifier 318 may remove characteristics from the encoded signal that are due to the subject information associated with the predicted subject associated with the signal.

The machine-learning model 300 may further include a fully connected layer 310. The fully connected layer 310 may be coupled to the output of the encoders 308. The fully connected layer 310 may include one or more functional blocks. For example, the fully connected layer 310 includes a first functional block 312a and a second functional block 312b in the illustrated embodiment. Each functional block of the fully connected layer 310 may be coupled to a corresponding encoder of the encoders 308 and may receive the signal output by the corresponding encoder. For example, the first functional block 312a corresponds to the first encoder 308a and receives the signal output by the first encoder 308a in the illustrated embodiment. The signal received by the first functional block 312a may be the encoded signal output by the first encoder 308a with the subject information removed. Further, the second functional block 312b corresponds to the second encoder 308b and receives the signal output by the second encoder 308b.

The functional blocks may apply functions to signals received by the functional blocks. The functional blocks may be trained, where the functions being applied by the functional blocks may be the same or may be different based on the training. For example, the first functional block 312a and the second functional block 312b may apply the same or different functions to the signals received by the first functional block 312a and the second functional block 312b from the first encoder 308a and the second encoder 308b, respectively. One or more of the functional blocks may implement momentum in the functions in some embodiments. For example, the one or more of the functional blocks may have functions being applied by the functional block updated by the training slower than the functions of the other functional blocks. For example, the second functional block 312b may implement momentum in the illustrated embodiment, where the function of the second functional block 312b is being updated slower by the training than the updating of the function of the first functional block 312a.

The fully connected layer 310 may combine the signals output by the functional blocks to produce a similarity 314. For example, the fully connected layer 310 may combine the signal output by the first functional block 312a and the signal output by the second functional block 312b to produce the similarity 314 in the illustrated embodiment. The similarity 314 may indicate an amount of similarity between the signals output by the first functional block 312a and the second functional block 312b. The fully connected layer 310 may apply a dot product or a cosine to the signals output by the functional blocks to produce the similarity 314. The fully connected layer 310 may determine contrastive loss 316 from the similarity 314. For example, the fully connected layer 310 may treat distances of vectors of positive examples and distances of vectors of negative examples as output probabilities and utilize cross entropy loss to produce the contrastive loss 316. Due to the subject information being removed by the adversarial identifier 318, the similarity 314 and the contrastive loss 316 may be subject-invariant.

The contrastive loss 316 may be utilized for training of the encoders 308 and/or the functional blocks of the fully connected layer 310. For example, the encoding algorithms utilized by the encoders 308 and/or the functions applied by the functional blocks of the fully connected layer 310 may be trained (ex., modified and/or adapted) to reduce distances between similar inputs to the machine-learning model 300 for the contrastive loss 316 and increase distances between dissimilar inputs to the machine-learning model 300 for the contrastive loss 316. In particular, if the signal 306 is similar to another signal processed by the machine-learning model 300 during a training session, the encoding algorithms and/or the functions may be trained to have a distance between a representation of the signal 306 and a representation of the other signal produced by the encoders 308 and the fully connected layer 310 closer together. If the signal 306 is dissimilar to another signal processed by the machine-learning model 300 during a training session, the encoding algorithms and/or the functions may be trained to have a distance between a representation of the signal 306 and a representation of the signal produced by the encoders 308 and the fully connected layer 310 farther apart. In some instances, the distances between the similar inputs and the dissimilar inputs may be Euclidean distances.

Figure 4:
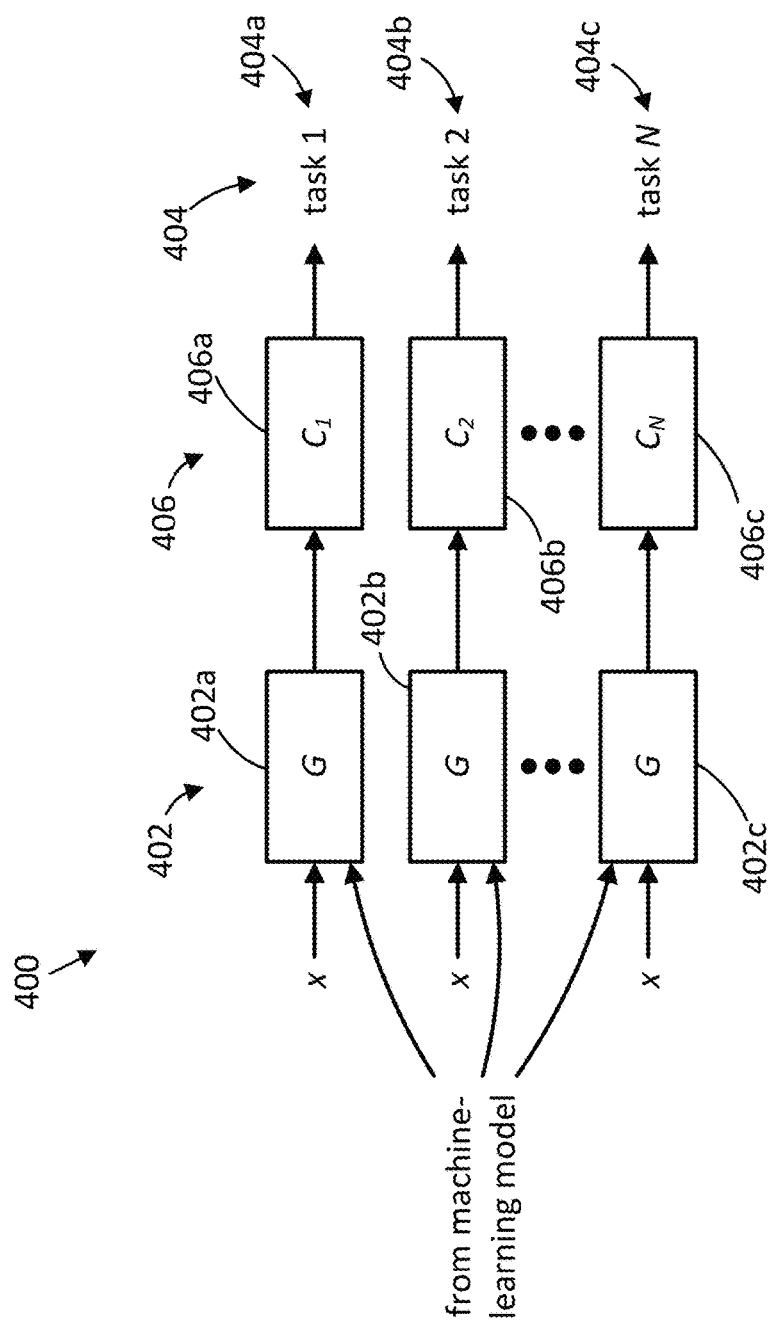
FIG. 4 illustrates an example classification model in accordance with some embodiments.

FIG. 4 illustrates an example classification model 400 in accordance with some embodiments. The classification model 400 may be coupled to a machine-learning model (such as the machine-learning model 200 (FIG. 2) or the machine-learning model 300 (FIG. 3)) and may receive signals from the machine-learning model to be classified. The classification model 400 may be implemented as the classification model 112 (FIG. 1).

The classification model 400 may include two or more encoders 402. For example, the classification model 400 shows a first encoder 402a, a second encoder 402b, and a third encoder 402c in the illustrated embodiment. The classification model 400 may include as many encoders as there are classifications for the classification model 400. For example, the classification model 400 shown has N tasks 404 and the classification model 400 may include N encoders 402, where N is a number of classifications that can be made by the classification model 400. Each of the encoders 402 may be coupled to the machine-learning model and may receive a signal from the machine-learning model to be encoded by the encoders 402. The encoders 402 may receive the signal from the machine-learning model and encode the signal to output an encoded signal. The encoders 402 may each utilize a same encoding algorithm, different encoding algorithms, or some combination thereof, to encode the signals received from the machine-learning model.

The classification model 400 may further include two or more classification blocks 406. For example, the classification model 400 shows a first classification block 406a, a second classification block 406b, and a third classification block 406c in the illustrated embodiment. The classification model 400 may include as many classification blocks 400 as encoders 402 and classifications for the classification model 400. Accordingly, as the classification model 400 shown has N tasks 404, the classification model 400 may include N classification blocks 406.

Each of the classification blocks 406 may be coupled to a corresponding one of the encoders 402 and may process the encoded signals output by the encoders 402. For example, the first classification block 406a may be coupled to the first encoder 402a and process encoded signals received from the first encoder 402a. The second classification block 406b may be coupled to the second encoder 402b and process encoded signals received from the second encoder 402b. The third classification block 406c may be coupled to the third encoder 402c and process encoded signals received from the third encoder 402c. The classification blocks 406 may indicate which of the classifications the signals received by the classification model 400 is to be classified. For example, the first classification block 406a may indicate whether signals received by the classification model 400 are to be classified to a first task 404a in the illustrated embodiment. The second classification block 406b may indicate whether signals received by the classification model 400 are to be classified to a second task 404b in the illustrated embodiment. The third classification block 406c may indicate whether signals received by the classification model 400 are to be classified to a third task 404c in the illustrated embodiment.

Due to the processing performed by the machine-learning model 200 or the machine-learning model 300 coupled to the classification model 400, much of the processing may be performed by the machine-learning model 200 or the machine-learning model 300 and less processing may be performed by the classification model 400 than in legacy classification systems. Additionally, the processing performed by the machine-learning model 200 or the machine-learning model 300 may cause the classification being performed by the classification model 400 may result in approved accuracy, sensitivity, and/or positive predictability of data classification as compared to legacy classification systems.

Figure 5:
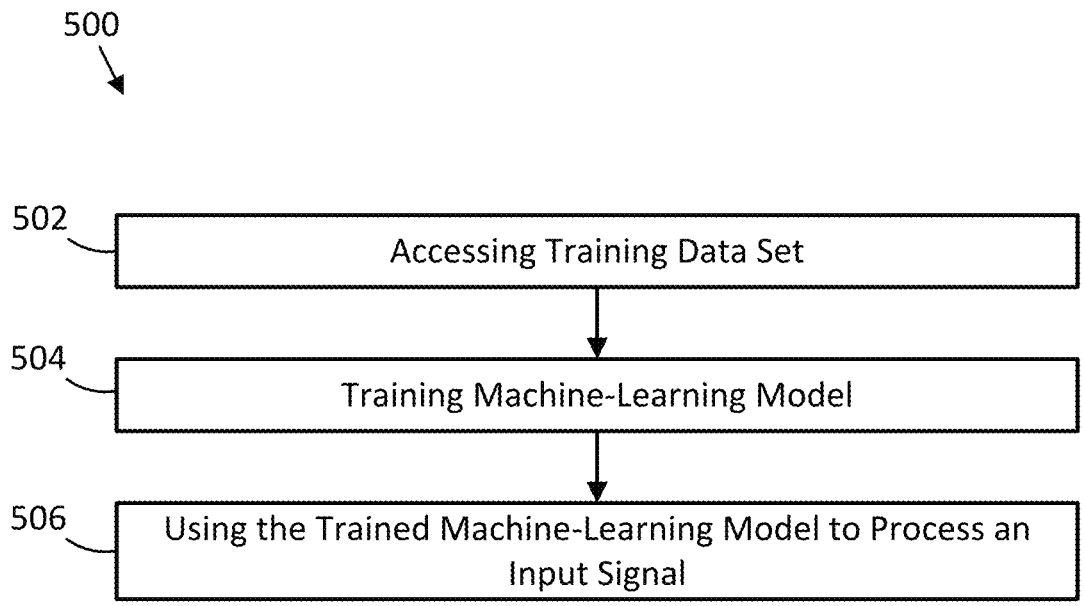
FIG. 5 illustrates an example procedure for a machine-learning model in accordance with some embodiments.

FIG. 5 illustrates an example procedure 500 for a machine-learning model in accordance with some embodiments. For example, the procedure 500 may be performed by the machine-learning model 110 (FIG. 1), the machine-learning model 200 (FIG. 2), and/or the machine-learning model 300 (FIG. 3).

The procedure 500 may include accessing a training data set in 502. In particular, the machine-learning model may access a training data set. The training data set may include multiple training elements. Each of the training elements may include one or more signals, or some portion of the one or more signals. In some embodiments, the signals may comprise biosignals, such as EEG signals, ECG signals, EMG signals, EOG signals, MEG signals, fNIRS signals, and/or other bioelectrical signals. Each of the multiple training elements may be associated with one or more subjects. In some embodiments, the multiple training elements may associated with a single subject. In other embodiments, the multiple training elements may be associated with one or more subjects and a machine-learning model may extract training elements associated with a single subject from the multiple training elements to utilize as the training data set. Further, each of the multiple training elements may be associated with different times in some embodiments. For example, the multiple training elements may be associated with a single subject in these embodiments, and the signals of the multiple training elements may have been captured from the single subject at different times.

The procedure 500 may include training the machine-learning model in 504. In particular, the machine-learning model may utilize self-supervised learning to train itself using the training data set accessed in 502. For example, the machine-learning model may train encoders (such as the encoders 208 (FIG. 2) and/or the encoders 308 (FIG. 3)) of the machine-learning model, functional blocks (such as the first functional block 212a (FIG. 2), the second functional block 212b, the first functional block 312a (FIG. 3), and/or the second functional block 312b (FIG. 3)) of the machine-learning model, and/or adversarial identifiers (such as the adversarial identifier 318 (FIG. 3)) of the machine-learning model.

The procedure 500 may include using the trained machine-learning model to process an input signal in 506. In particular, the machine-learning model trained in 504 may be utilized to process an input signal input into the machine-learning model. For example, the machine-learning model may receive a signal to be processed, perform processing of the signal, and output an output based on the received signal to a classification model (such as the classification model 112 (FIG. 1) and/or the classification model 400 (FIG. 4)) for classification.

Figure 6:
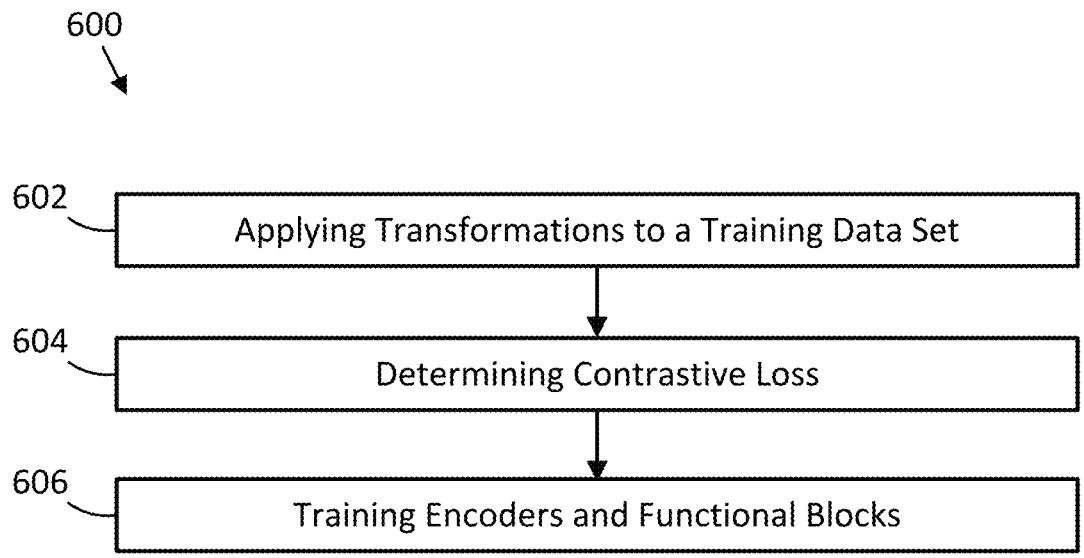
FIG. 6 illustrates an example procedure for training a machine-learning model in accordance with some embodiments.

FIG. 6 illustrates an example procedure 600 for training a machine-learning model in accordance with some embodiments. For example, the procedure 600 may be performed by the machine-learning model 110 (FIG. 1), the machine-learning model 200 (FIG. 2), and/or the machine-learning model 300 (FIG. 3) for training the machine-learning model. The procedure 600 may be performed as part of the training of the machine-learning model in 504 (FIG. 5). The procedure 600 may be performed with a training data set where each training element of training data set is associated with a single subject. Accordingly, when the procedure 600 is performed as part of 504, the training data set accessed in 502 may have each training element associated with a single subject or the machine-learning model may access training elements associated with a single subject to produce the training data set.

The procedure 600 may include applying transformations to a training data set in 602. In particular, the machine-learning model may apply transformations to the training data set received by the machine-learning model. Transformation elements (such as the transformation elements 202 (FIG. 2) and/or the transformation elements 302 (FIG. 3)) of the machine-learning model may apply transformations to the signals of the training data set. For example, the signal may be referred to as $x_i$. A first transformation element (such as the first transformation element 202a (FIG. 2) or the first transformation element 302a (FIG. 3)) may receive the signal and may apply a transformation to the signal, which may be referred to as $T_1(x_i)$. A second transformation element (such as the second transformation element 202b (FIG. 2) or the second transformation element 302b (FIG. 3)) may receive the signal and may apply a transformation to the signal, which may be referred to as $T_2(x_i)$. The transformations applied by the first transformation element and the second transformation element may be different. For example, the second transformation element may apply a transformation that include a perturbation, such as temporal cutout, temporal delay, noise, filtering, signal mixing, spatial rotation, spatial shifting, sensor dropout, and/or sensor cutout.

The procedure 600 may include determining a contrastive loss in 604. In particular, the machine-learning model may determine a contrastive loss based on the signals of the training data set. Encoders (such as the encoders 208 (FIG. 2) or the encoders 308 (FIG. 3)) of the machine-learning model may receive the transformed signals from the transformation elements and may encode the transformed signals. For example, a first encoder (such as the first encoder 208a (FIG. 2) or the first encoder 308a (FIG. 3)) may receive the transformed signals from the first transformation element and may encode the signals, which may be represented by $G(T_1(x_i))$ and referred to as $h_i$. A second encoder (such as the second encoder 208b (FIG. 2) or the second encoder 308b (FIG. 3)) may receive the transformed signals from the second transformation element and may encode the signals, which may be represented by $G_k(T_2(x_i))$. The encoding algorithms utilized by the encoders for encoding the signals may be initiated to a particular encoding algorithm for determining the contrastive loss. For example, the encoding algorithms may be initiated with parameters $\theta_G$.

A fully connected layer (such as the fully connected layer 210 (FIG. 2) or the fully connected layer 310 (FIG. 3)) may receive the outputs of encoders and determine a contrastive loss based on the outputs. For example, a first functional block (such as the first functional block 212a (FIG. 2) or the first functional block 312a (FIG. 3)) of the fully connected layer may receive the encoded signals output by the first encoder and apply a function to the encoded signals, where the output of the first functional block may be represented by $F(G(T_1(x_i)))$ and may be referred to as $q_i$. A second functional block (such as the second functional block 212b (FIG. 2) or the second functional block 312b (FIG. 3)) of the fully connected layer may receive the encoded signals output by the second encoder and apply a function to the encoded signals, where the output of the second functional block may be represented by $F_k(G_k(T_2(x^i)))$ and may be referred to as $k_i$. $q_i$ and $k_i$ may be normalized to unit L2-norm. The contrastive loss may be determined based on $q_i$ and $k_i$. For example, the contrastive loss may be determined based on $$l_i = -\log \frac{\exp(q_i^T k_i / \tau)}{\sum_{j=0}^{N} \exp(q_i^T k_j / \tau)},$$

where inner product $q_i^T k_i$ is used as a similarity metric and T is a learnable or tunable temperature parameter. The inner product $q_i^T k_i$ may be contrasted against the inner product of $q_i$ and N−1 negative examples which are indexed by j. The contrastive loss may focus on features that differentiate each time segment from other time segments.

The procedure 600 may include training encoders and functional blocks in 606. In particular, the machine-learning model may train the encoders and the functional blocks of the machine-learning model. The machine-learning model may train the encoders and the functional blocks based on the contrastive loss. The encoders and the functional blocks may be trained to maximize the mutual information between the output of the first transformation element and the output of the second transformation element. For example, the encoders and the functional blocks may be trained to maximize the mutual information between $T_1(x_i)$ and $T_2(x_i)$ for any transformation applied by the first transformation element ($T_1$) and any transformation applied by the second transformation element ($T_2$). In some embodiments, the encoders and the functional blocks may be trained to move representations of training elements of the training data set associated with a same subject closer together and move representations of training elements associated with different subjects farther apart based on the contrastive loss. The second encoder and the second functional block may present momentum, where the encoding algorithm ($G_k$) of the second encoder and the function ($F_k$) of the second functional block may update slower than the encoding algorithm of the first encoder and the function of the first functional block, respectively. The momentum update $G_k$ and $F_k$ may enable use of negative examples from previous batches to increase the number of negative examples.

The procedure 600 may be repeated until the encoders and the functional blocks are adequately trained. For example, 602, 604, and 606 may be repeated until the encoders and the functional blocks meet a defined level of training.

Figure 7:
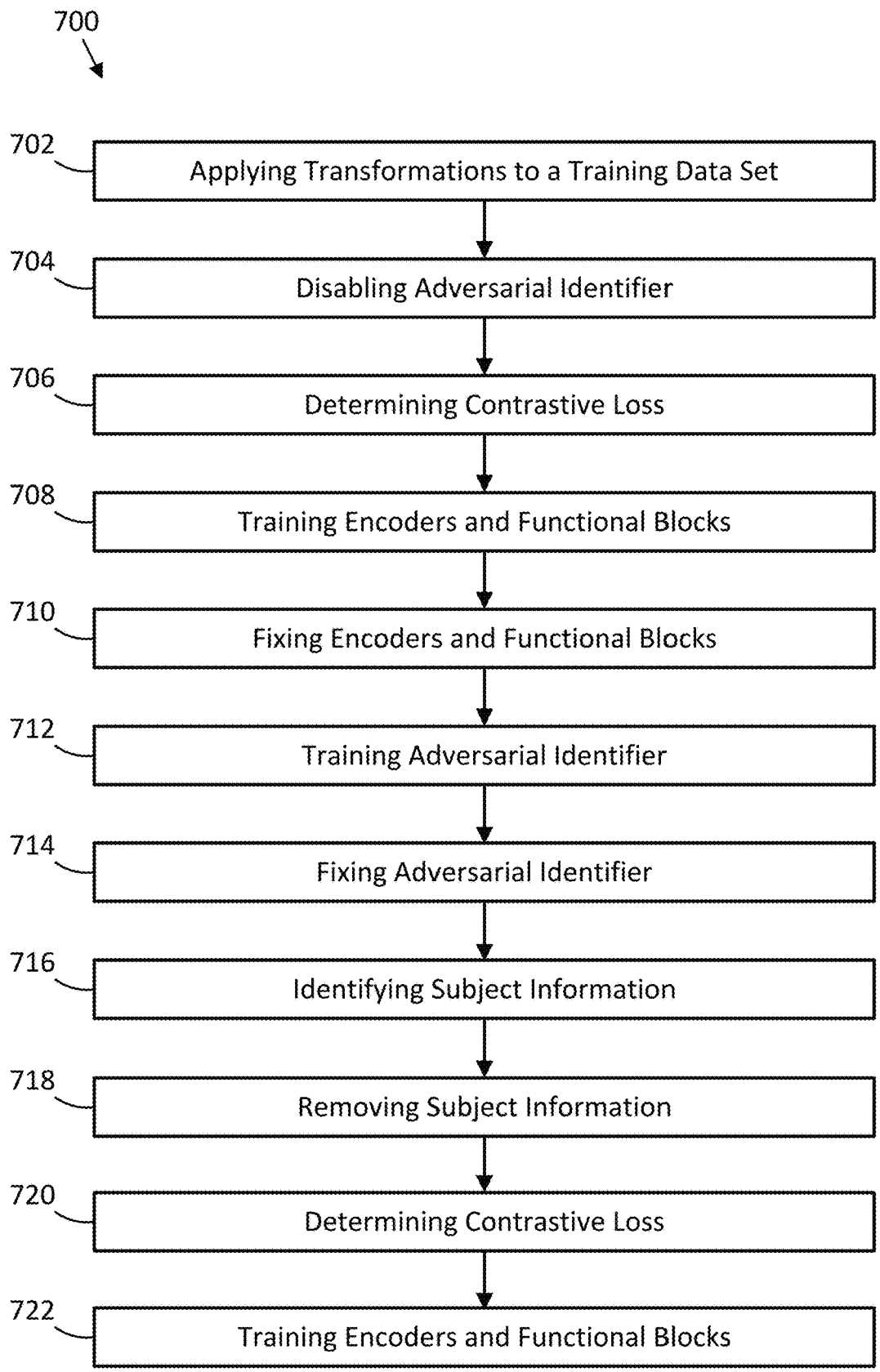
FIG. 7 illustrates an example procedure for training a machine-learning model in accordance with some embodiments.

FIG. 7 illustrates an example procedure 700 for training a machine-learning model in accordance with some embodiments. For example, the procedure 700 may be performed by the machine-learning model 110 (FIG. 1) and/or the machine-learning model 300 (FIG. 3) for training the machine-learning model. The procedure 700 may be performed as part of the training of the machine-learning model in 504 (FIG. 5). The procedure 700 may be performed with a training data set where each training element of training data set is associated with one or more subjects, or a single subject. Accordingly, when the procedure 700 is performed as part of 504, the training data set accessed in 502 may have each training element associated with one or more subjects or may have each training element associated with a single subject.

The procedure 700 may include applying transformations to a training data set in 702. In particular, the machine-learning model may apply transformations to the training data set received by the machine-learning model. Transformation elements (such as the transformation elements 302 (FIG. 3)) of the machine-learning model may apply transformations to the signals of the training data set. For example, the signal may be referred to as $x_i$. A first transformation element (such as the first transformation element 302a (FIG. 3)) may receive the signal $x_i$, and may apply a transformation to the signal, which may be referred to as $T_1(x_i)$. A second transformation element (such as the second transformation element 302b (FIG. 3)) may receive the signal $x_i$ and may apply a transformation to the signal, which may be referred to as $T_2(x_i)$. The transformations applied by the first transformation element and the second transformation element may be different. For example, the second transformation element may apply a transformation that include a perturbation, such as temporal cutout, temporal delay, noise, filtering, signal mixing, spatial rotation, spatial shifting, sensor dropout, and/or sensor cutout.

The procedure 700 may include disabling an adversarial identifier in 704. For example, the machine-learning model may disable an adversarial identifier (such as the adversarial identifier 318 (FIG. 3)). Disabling the adversarial identifier may include setting the adversarial identifier to not remove subject information from an output of an encoder (such as the first encoder 308a (FIG. 3)). The adversarial identifier may further avoid predicting the subject based on the encoded signal output by the encoder. In other embodiments, disabling the adversarial identifier may include setting the adversarial identifier to remove a set of subject information for the output of the encoder.

The procedure 700 may include determining a contrastive loss in 706. In particular, the machine-learning model may determine a contrastive loss based on the signals of the training data set. The contrastive loss may be determined with the adversarial identifier disabled. Encoders (such as the encoders 308 (FIG. 3)) of the machine-learning model may receive the transformed signals from the transformation elements and may encode the transformed signals. For example, a first encoder (such as the first encoder 308a (FIG. 3)) may receive the transformed signals from the first transformation element and may encode the signals, which may be represented by $G(T_1(x_i))$ and referred to as $h_i$. A second encoder (such as the second encoder 308b (FIG. 3)) may receive the transformed signals from the second transformation element and may encode the signals, which may be represented by $G_k(T_2(x_i))$. The encoding algorithms utilized by the encoders for encoding the signals may be initiated to a particular encoding algorithm for determining the contrastive loss. For example, the encoding algorithms may be initiated with parameters 8G.

A fully connected layer (such as the fully connected layer 310 (FIG. 3)) may receive the outputs of encoders and determine a contrastive loss based on the outputs. For example, a first functional block (such as the first functional block 312a (FIG. 3)) of the fully connected layer may receive the encoded signals output by the first encoder and apply a function to the encoded signals, where the output of the first functional block may be represented by $F(G(T_1(x_i)))$ and may be referred to as A second functional block (such as the second functional block 312b (FIG. 3)) of the fully connected layer may receive the encoded signals output by the second encoder and apply a function to the encoded signals, where the output of the second functional block may be represented by $F_k(G_k(T_2(x_i)))$ and may be referred to as $k_i$. $q_i$ and $k_i$ may be normalized to unit L2-norm. The contrastive loss may be determined based on $q_i$ and $k_i$. For example, the contrastive loss may be determined based on $$l_i = -\log \frac{\exp(q_i^T k_i / \tau)}{\sum_{j=0}^{N} \exp(q_i^T k_j / \tau)},$$

where inner product $q_i^T k_i$ is used as a similarity metric and $\tau$ is a learnable or tunable temperature parameter. The inner product $q_i^T k_i$ may be contrasted against the inner product of $q_i$ and N−1 negative examples that are indexed by j. The contrastive loss may focus on features that differentiate each time segment from other time segments.

The procedure 700 may include training encoders and functional blocks in 708. In particular, the machine-learning model may train the encoders and the functional blocks of the machine-learning model with the adversarial identifier disabled. The machine-learning model may train the encoders and the functional blocks based on the contrastive loss. The encoders and the functional blocks may be trained to maximize the mutual information between the output of the first transformation element and the output of the second transformation element. For example, the encoders and the functional blocks may be trained to maximize the mutual information between $T_1(x_i)$ and $T_2(x_i)$ for any transformation applied by the first transformation element ($T_1$) and any transformation applied by the second transformation element ($T_2$). In some embodiments, the encoders and the functional blocks may be trained to move representations of training elements of the training data set associated with a same subject closer together and move representations of training elements associated with different subjects farther apart based on the contrastive loss. The second encoder and the second functional block may present momentum, where the encoding algorithm ($G_k$) of the second encoder and the function ($F_k$) of the second functional block may update slower than the encoding algorithm of the first encoder and the function of the first functional block, respectively. The momentum update $G_k$ and $F_k$ may enable use of negative examples from previous batches to increase the number of negative examples.

The procedure 700 may include fixing the encoders and the functional blocks in 710. In particular, the machine-learning model may fix the encoders with the encoding algorithms that were trained in 708. Further, the machine-learning model may fix the functional blocks with the functions that were trained in 708. The encoders and the functional blocks may be fixed to apply then encoding algorithms and the functions, respectively, to the training data set.

The procedure 700 may include training the adversarial identifier in 712. In particular, the machine-learning model may train the adversarial identifier with the encoders and the functional blocks fixed. The adversarial identifier may be enabled during the training. The adversarial identifier may remove (or extract) subject information to make the machine-learning model subject-invariant. The adversarial identifier (which may be referred to as classifier $C_{sub}$) may be trained to predict the subject (or the identity of the subject) for each example (or signal output by the first encoder) based on latent vector $h_i$, which may be indicated as $C_{sub}(h_i) = C_{sub}(G(x_i))$. The adversarial identifier may provide j-th element, $C_{sub}^j(h_i)$, corresponds to the probability of $h_i$ being from subject j. The adversarial identifier may be trained with the fixed encoder G via cross entropy loss. The cross entropy loss may be defined by $\ell_{sub,i} = -\sum_{j=0}^{N_{sub}-1} \mathbb{1}_{[j=s_i]} \log C_{sub}^j (G(x_i))$, where $N_{sub}$ is the number of subjects, $s_i$ is the subject number of example i, and $\mathbb{1}_{[j=s_i]}$ is an indicator function with a value of 1 when $j=s_i$.

The procedure 700 may include fixing the adversarial identifier in 714. In particular, the machine-learning model may fix the adversarial identifier with a certain identification model from the training in 712. The adversarial identifier may apply the identification model for identifying the subjects (or identity of the subjects) and removing the subject information while fixed.

The procedure 700 may include identifying subject information in 716. In particular, the machine-learning model may identify subject information within the training data set. The adversarial identifier may identify the subject information based on the identification model fixed in 714. For example, the adversarial identifier may identify characteristics of the training data set related to subject information associated with a predicted subject. The subject information may include information that is unique to the subject or unique to a group of subjects, such as an irregular heartbeat, unique heart function, unique brain function, or other unique characteristics that differ from that which is uniform (or expected to be uniform) for all subjects. The subject information may be represented by additional peaks, missing peaks, differing amplitudes, differing frequencies, or other differences from a signal which is uniform (or expected to be uniform) for all subjects.

The procedure 700 may include removing subject information in 718. In particular, the adversarial identifier may remove the subject information from the training data set. The adversarial identifier may apply the identification model with which it was fixed in 714 to remove the subject information from the training data set. In some embodiments, the adversarial identifier may further predict the subjects of the training data set based on the identification model.

The procedure 700 may include determining a contrastive loss in 720. In particular, the machine-learning model may determine a contrastive loss based on the signals of the training data set. The contrastive loss may be determined with the subject information removed by the adversarial identifier in 718. The encoders of the machine-learning model may receive the transformed signals from the transformation elements and may encode the transformed signals. For example, the first encoder may receive the transformed signals from the first transformation element and may encode the signals, which may be represented by $G(T_1(x_i))$ and referred to as $h_i$. The second encoder may receive the transformed signals from the second transformation element and may encode the signals, which may be represented by $G_k(T_2(x_i))$. The encoding algorithms utilized by the encoders for encoding the signals may be initiated to the encoding algorithms resulting from the training of the encoders in 710.

A fully connected layer may receive the outputs of encoders and determine a contrastive loss based on the outputs. For example, a first functional block (such as the first functional block 312a (FIG. 3)) of the fully connected layer may receive the encoded signals output by the first encoder and apply a function to the encoded signals, where the output of the first functional block may be represented by $F(G(T_1(x_i)))$ and may be referred to as $q_i$. A second functional block (such as the second functional block 312b (FIG. 3)) of the fully connected layer may receive the encoded signals output by the second encoder and apply a function to the encoded signals, where the output of the second functional block may be represented by $F_k(G_k(T_2(x_i)))$ and may be referred to as $k_i$. $q_i$ and may be normalized to unit L2-norm. The functions utilized by the functional blocks may be initiated to the functions resulting from the training of the functional blocks in 710.

The training of the encoders and the functional blocks may be regularized with the adversarial fixed. For example, the encoder G may confuse the adversarial identifier by using a fixed $C_{sub}$ to regularize the training of G and F. A regularization term of $r_{sub,i} = \sum_{j=0}^{N_{sub}-1} \mathbb{1}_{[j=s_i]} \log(1 - c_{sub}^j (G(x_i)))$. Based on the regularization term, the loss function becomes $$\operatorname*{argmin}_{F,G} \mathbb{E}_i [l_i + \lambda r_{sub,i}], \text{ and}$$

$$\operatorname*{argmin}_{C} \mathbb{E}_i [l_{sub,i}],$$

where $\lambda$ is a tunable hyperparameter.

The procedure 700 may include training the encoders and the functional blocks in 722. In particular, the machine-learning model may retrain the encoders and the functional blocks based on the contrastive loss determined in 720. The encoders and the functional blocks may be trained to maximize the mutual information between $T_1(x_i)$ and $T_2(x_i)$ for any transformation applied by the first transformation element ($T_1$) and any transformation applied by the second transformation element ($T_2$). In some embodiments, the encoders and the functional blocks may be trained to move representations of training elements of the training data set associated with a same subject closer together and move representations of training elements associated with different subjects farther apart based on the contrastive loss. The second encoder and the second functional block may present momentum, where the encoding algorithm ($G_k$) of the second encoder and the function ($F_k$) of the second functional block may update slower than the encoding algorithm of the first encoder and the function of the first functional block, respectively. The momentum update $G_k$ and $F_k$ may enable use of negative examples from previous batches to increase the number of negative examples.

Figure 8:
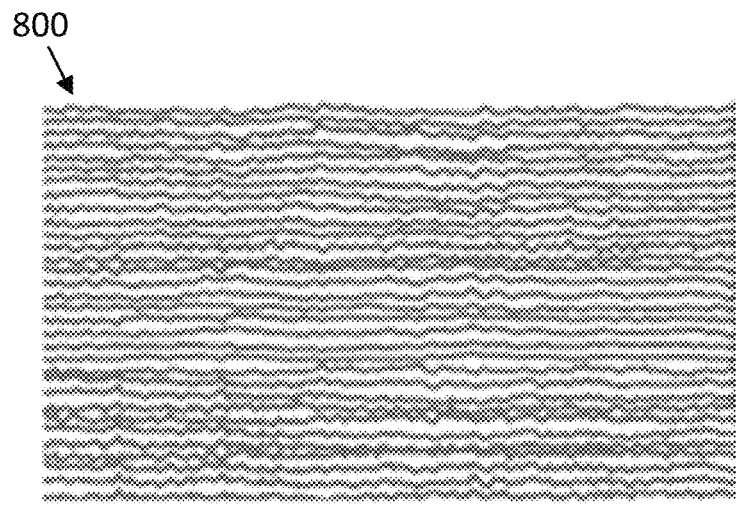
FIG. 8 illustrates an example signal in accordance with some embodiments.

FIG. 8 illustrates an example signal 800 in accordance with some embodiments. For example, the signal 800 may be a signal that may be included as a training element of a training data set. The signal 800 may comprise a multi-channel signal as shown. In some embodiments, the signal 800 may comprise a biosignal, such as EEG signals, ECG signals, EMG signals, EOG signals, MEG signals, fNIRS signals, and/or other bioelectrical signals. The signal 800 is an example of a signal that may be provided to a machine-learning model as part of a training data set. The signal 800 may be a temporal portion of a larger signal. For example, a larger signal may be separated into temporal portions, such as the signal 800 being a temporal portion of the larger signal.

Figure 9:
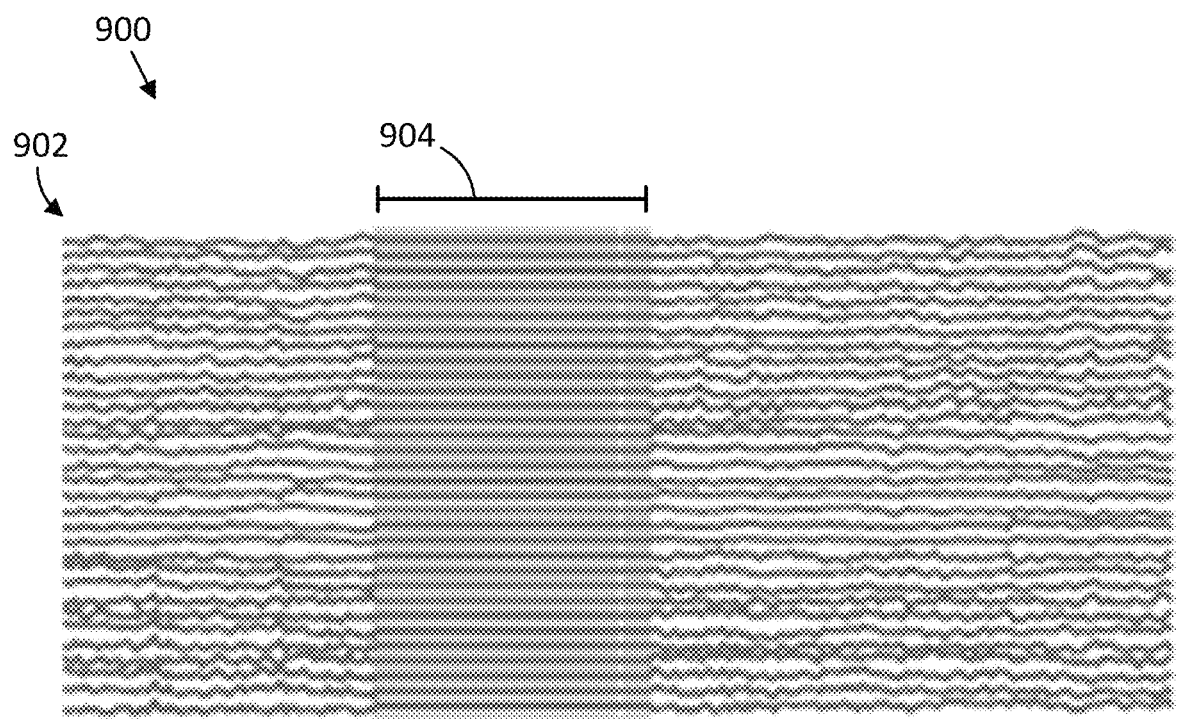
FIG. 9 illustrates an example temporal cutout representation in accordance with some embodiments.

FIG. 9 illustrates an example temporal cutout representation 900 in accordance with some embodiments. In particular, the temporal cutout representation 900 may be produced by a transformation element (such as the transformation elements 202 (FIG. 2) or the transformation elements 302 (FIG. 3)) applying a temporal cutout to a signal, such as the signal 800. The temporal cutout shown in the temporal cutout representation 900 may be a perturbation applied by a transformation element. The temporal cutout representation 900 may include a signal 902 with a window 904 cut out of the signal 902. The cutout of the signal 902 may be implemented by replacing a temporal portion of the signal 902 (or the multi-channels of the signal) equal to the temporal duration of the window 904 with a set value. In some embodiments, the signal 902 may be replaced by a value of zero for the temporal duration of the window 904. For example, a random contiguous section of a time-series signal (i.e., a cutout window) may be replaced with zeroes.

Figure 10:
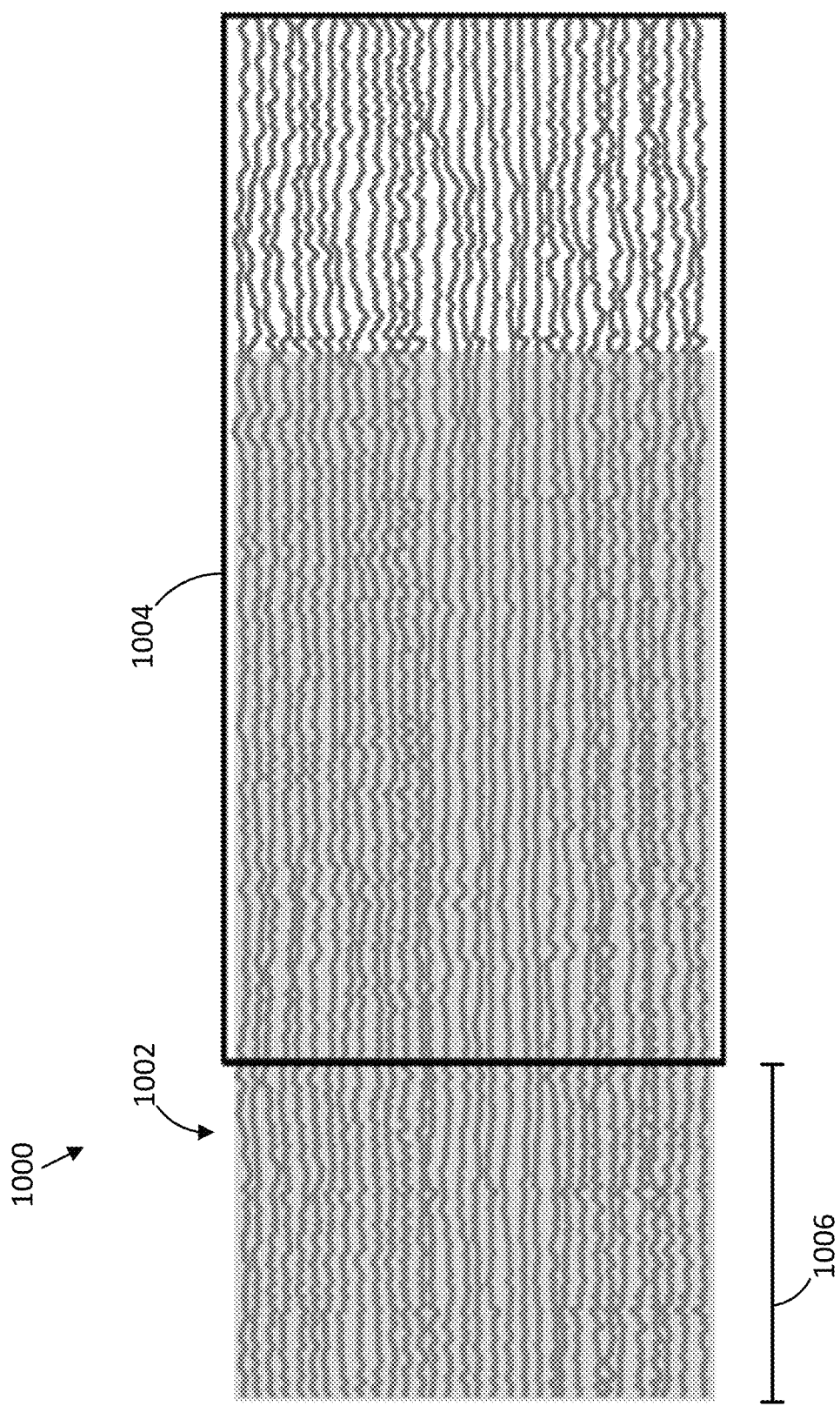
FIG. 10 illustrates an example temporal delay representation in accordance with some embodiments.

FIG. 10 illustrates an example temporal delay representation 1000 in accordance with some embodiments. In particular, the temporal delay representation 1000 may be produced by a transformation element (such as the transformation elements 202 (FIG. 2) or the transformation elements 302 (FIG. 3)) applying a temporal delay to a signal, such as the signal 800. The temporal delay shown in the temporal delay representation 1000 may be a perturbation applied by a transformation element. The temporal delay representation 1000 may include a signal 1002 with a delayed signal 1004 (as shown by the rectangle). In particular, the signal 1002 may be an original signal applied to a transformation element. The transformation element may apply a temporal delay 1006. The transformation element applying the delay may include removing a portion of the signal 1002 during the temporal delay 1006 and adding another portion of the larger signal following the signal 1002 equal to the temporal delay 1006 to the end of the signal to produce the delayed signal 1004. For example, the time-series data may be randomly delayed in time. The transformation element may output to the delayed signal 1004.

FIG. 11 illustrates an example noise introduction representation 1100 in accordance with some embodiments. In particular, the noise introduction representation 1100 may be produced by a transformation element (such as the transformation elements 202 (FIG. 2) or the transformation elements 302 (FIG. 3)) applying noise introduction to a signal, such as the signal 800. The noise introduction shown in the noise introduction representation 1100 may be a perturbation applied by a transformation element. The noise introduction representation 1100 may include an original signal 1102 and a noise signal 1104. A transformation element may receive the original signal 1102 and combine the noise signal 1104 with the original signal 1102 to produce a combined output signal 1106. In some embodiments, the noise signal 1104 may be added to the original signal 1102 to produce the combined output signal 1106. The noise signal 1104 may comprise independent and identically distributed Gaussian noise in some embodiments.

FIG. 12 illustrates an example signal mixing representation 1200 in accordance with some embodiments. In particular, the signal mixing representation 1200 may be produced by a transformation element (such as the transformation elements 202 (FIG. 2) or the transformation elements 302 (FIG. 3)) mixing another signal with a signal, such as the signal 800. The signal mixing shown in the signal mixing representation 1200 may be a perturbation applied by a transformation element. The signal mixing representation 1200 may include an original signal 1202 and a second signal 1204. A transformation element may receive the original signal 1202 and combine the second signal 1204 with the original signal 1202 to produce a combined output signal 1206. In some embodiments, the second signal 1204 may be added to the original signal 1202 to produce the combined output signal 1206. The second signal 1204 may be another time instance of a signal corresponding to the original signal or may be a signal associated with another subject (e.g., other subject data) to the original signal 1202 to simulate correlated noise.

Figure 13:
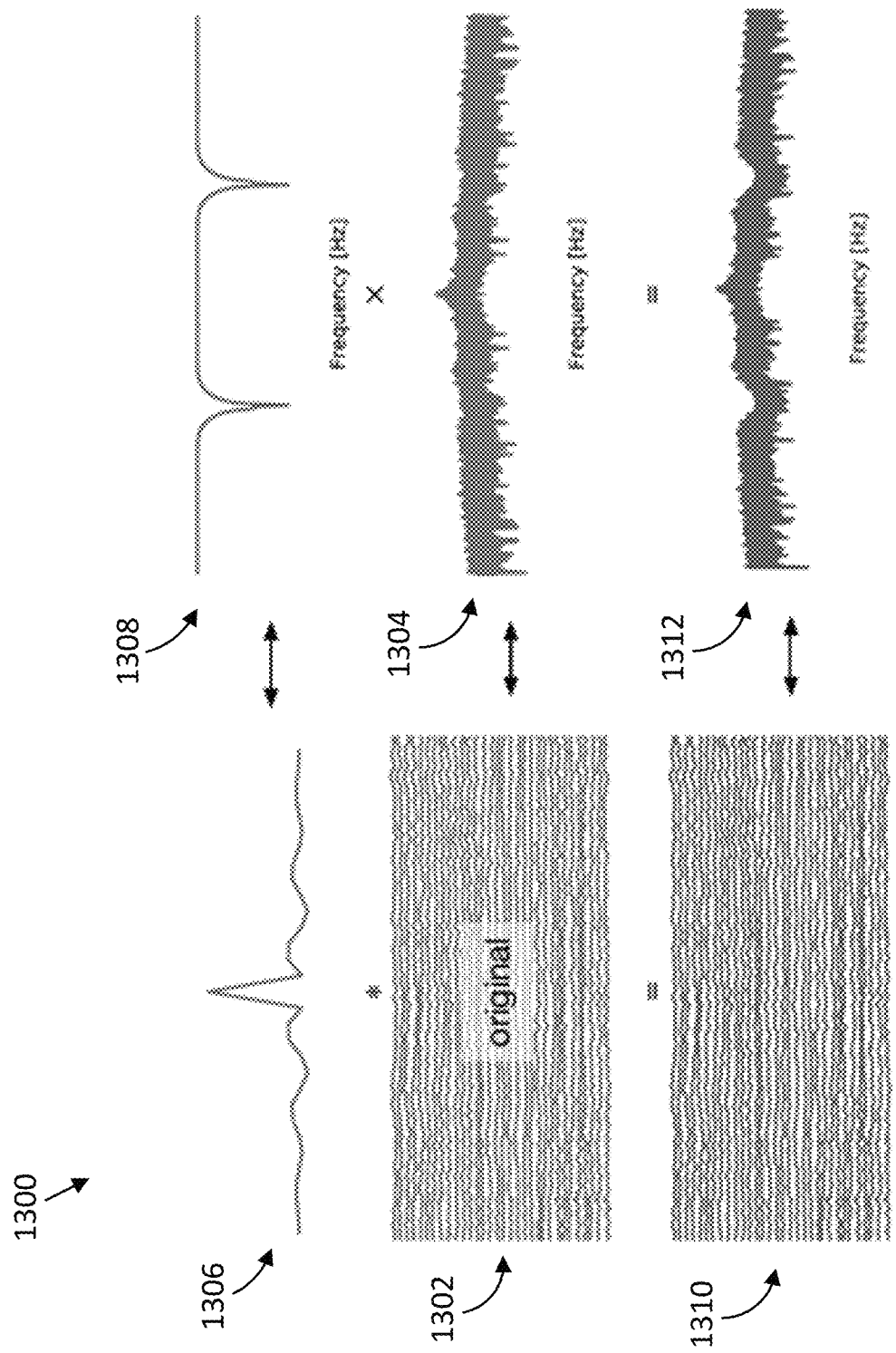
FIG. 13 illustrates an example filtering representation in accordance with some embodiments.

FIG. 13 illustrates an example filtering representation 1300 in accordance with some embodiments. In particular, the filtering representation 1300 may be produced by a transformation element (such as the transformation elements 202 (FIG. 2) or the transformation elements 302 (FIG. 3)) applying a filter to signal, such as the signal 800. The filtering shown in the filtering representation 1300 may be a perturbation applied by a transformation element. The filtering representation 1300 may include an original signal 1302 and a frequency representation 1304 of the original signal 1302, where the frequency representation 1304 is produced by transforming the original signal 1302 from the time domain to the frequency domain. The filtering representation 1300 further includes a filter 1306 and a frequency representation 1308 of the filter, where the frequency representation 1304 is produced by transforming the filter 1306 from the time domain to the frequency domain. The transformation element may receive the original signal 1302 and apply the filter 1306 to the original signal 1302 in either the time domain or frequency domain. The filtering representation 1300 may further include a resultant signal 1310 and a frequency representation 1312 of the resultant signal 1310 that can be produced by applying the filter 1306 to the original signal 1302. For example, the signal content at a randomly selected frequency band may be filtered out using a bandstop filter. The transformation element may output the resultant signal 1310 or the frequency representation 1312 of the resultant signal 1310.

Figure 14:
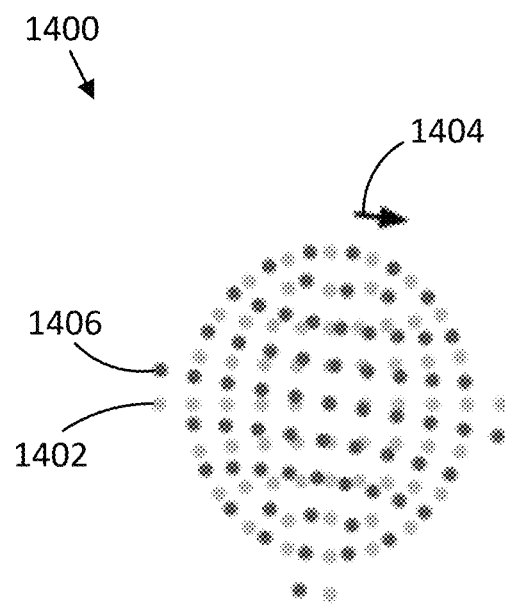
FIG. 14 illustrates an example spatial rotation representation in accordance with some embodiments.

FIG. 14 illustrates an example spatial rotation representation 1400 in accordance with some embodiments. In particular, the spatial rotation representation 1400 may be produced by a transformation element (such as the transformation elements 202 (FIG. 2) or the transformation elements 302 (FIG. 3)) applying a spatial rotation to a signal, such as the signal 800. The spatial rotation shown in the spatial rotation representation 1400 may be a perturbation applied by a transformation element. Spatial rotation may be applied to signals where locations of the sensors is represented in the signal. For example, spatial rotation may be applied to EEG signals where the location of the sensors producing the multi-channel signal is taken account in the signal. The spatial rotation representation 1400 may include an original signal 1402 represented by lighter dots that are arranged in accordance with the position of the sensors that produce the multi-channel signal. The transformation element may receive the original signal 1402 and apply a spatial rotation to the original signal 1402 either in the clockwise or counter-clockwise direction. In the illustrated embodiment, the transformation element is shown applying a spatial rotation in the clockwise direction to the original signal 1402 as indicated by the arrow 1404. The spatial rotation representation 1400 further includes a resultant signal 1406 (as represented by darker dots that are arranged in accordance with rotated positions of the signal) that may be produced by the spatial rotation being applied to the original signal 1402. The transformation element may output the resultant signal 1406.

Figure 15:
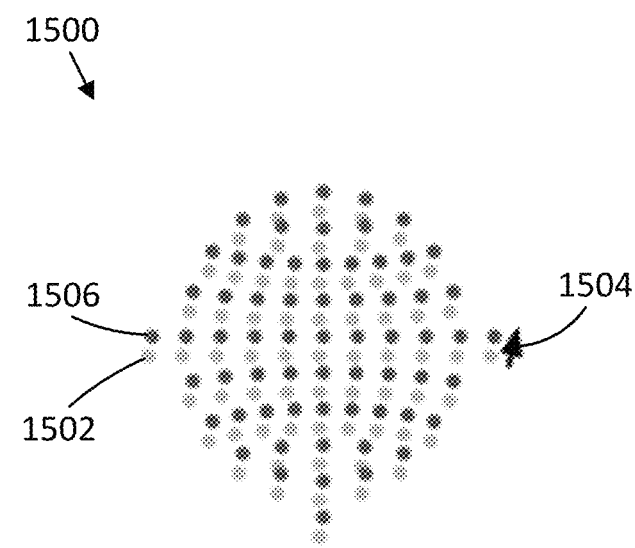
FIG. 15 illustrates an example spatial shift representation in accordance with some embodiments.

FIG. 15 illustrates an example spatial shift representation 1500 in accordance with some embodiments. In particular, the spatial shift representation 1500 may be produced by a transformation element (such as the transformation elements 202 (FIG. 2) or the transformation elements 302 (FIG. 3)) applying a spatial shift to a signal, such as the signal 800. The spatial shift shown in the spatial shift representation 1500 may be a perturbation applied by a transformation element. Spatial shift may be applied to signals where locations of the sensors is represented in the signal. For example, spatial shift may be applied to EEG signals where the location of the sensors producing the multi-channel signal is taken account in the signal. The spatial shift representation 1500 may include an original signal 1502 represented by lighter dots that are arranged in accordance with the position of the sensors that produce the multi-channel signal. The transformation element may receive the original signal 1502 and apply a spatial shift to the original signal 1502 in any direction. In the illustrated embodiment, the transformation element is shown applying a spatial shift in the diagonal upper right direction (relative to the orientation shown in FIG. 15) to the original signal 1502 as indicated by the arrow 1504. The spatial shift representation 1500 further includes a resultant signal 1506 (as represented by darker dots that are arranged in accordance with rotated positions of the signal) that may be produced by the spatial shift being applied to the original signal 1502. The transformation element may output the resultant signal 1506.

Figure 16:
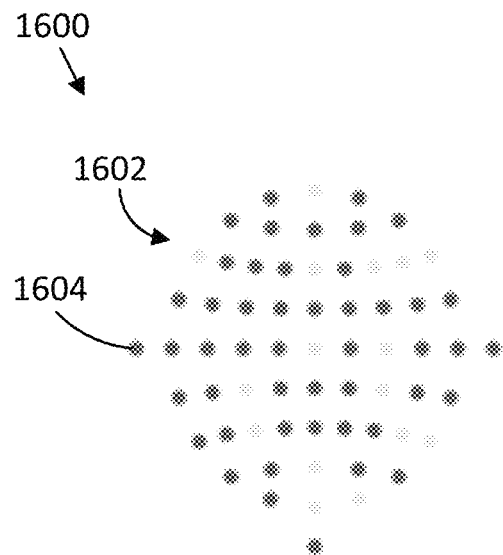
FIG. 16 illustrates an example spatial dropout representation in accordance with some embodiments.

FIG. 16 illustrates an example spatial dropout representation 1600 in accordance with some embodiments. In particular, the spatial dropout representation 1600 may be produced by a transformation element (such as the transformation elements 202 (FIG. 2) or the transformation elements 302 (FIG. 3)) applying a spatial dropout to a signal, such as the signal 800. The spatial dropout shown in the spatial dropout representation 1600 may be a perturbation applied by a transformation element. Spatial dropout may be applied to signals where locations of the sensors is represented in the signal. For example, spatial dropout may be applied to EEG signals where the location of the sensors producing the multi-channel signal is taken account in the signal. The spatial dropout representation 1600 may include an original signal 1602 represented by both light dots and dark dots that are arranged in accordance with the position of the sensors that produce the multi-channel signal. The transformation element may receive the original signal 1602 and apply a spatial dropout to the original signal 1602. The spatial dropout may be performed by removing portions of the signal (such as channels of the signal in the multi-channel signal illustrated) or setting portions of the signal to a particular value (such as zero). The spatial dropout representation 1600 includes a resultant signal 1604 (as represented by darker dots that are arranged in accordance with rotated positions of the signal) that may be produced by the dropping out a portion of the original signal 1602 (as represented by the lighter dots). For example, a random subset of sensors may be replaced with zeroes. The transformation element may output the resultant signal 1604.

Figure 17:
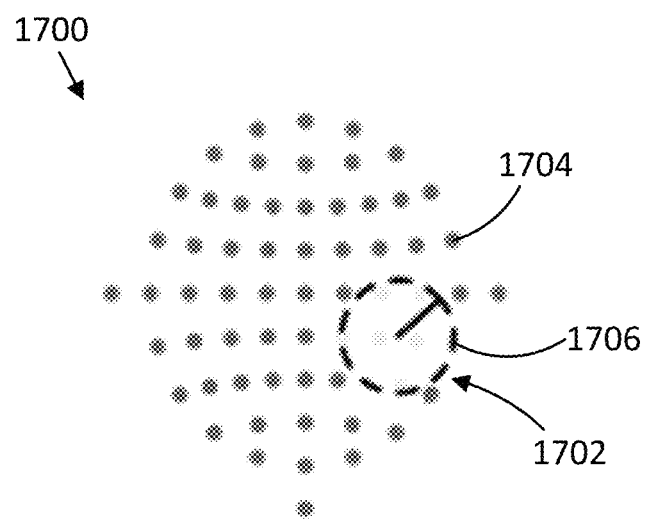
FIG. 17 illustrates an example spatial cutout representation in accordance with some embodiments.

FIG. 17 illustrates an example spatial cutout representation 1700 in accordance with some embodiments. In particular, the spatial cutout representation 1700 may be produced by a transformation element (such as the transformation elements 202 (FIG. 2) or the transformation elements 302 (FIG. 3)) applying a spatial cutout to a signal, such as the signal 800. The spatial cutout shown in the spatial cutout representation 1700 may be a perturbation applied by a transformation element. Spatial cutout may be applied to signals where locations of the sensors is represented in the signal. For example, spatial cutout may be applied to EEG signals where the location of the sensors producing the multi-channel signal is taken account in the signal. The spatial cutout representation 1700 may include an original signal 1702 represented by both light dots and dark dots that are arranged in accordance with the position of the sensors that produce the multi-channel signal. The transformation element may receive the original signal 1702 and apply a spatial cutout to the original signal 1702. The spatial cutout may be performed by removing adjacent portions of the signal (such as channels of the signal in the multi-channel signal illustrated) or setting adjacent portions of the signal to a particular value (such as zero). The spatial cutout representation 1700 includes a resultant signal 1704 (as represented by darker dots that are arranged in accordance with rotated positions of the signal) that may be produced by the cutting out an adjacent portion of the original signal 1702 (as represented by the lighter dots). In the illustrated embodiment, the portion of the original signal 1702 that is cut out is defined by circle 1706. A portion of a signal relating to sensors in a small region of space may be replaced with zeroes. The transformation element may output the resultant signal 1704.

While the perturbations are described separately, it should be understood that a transformation element may apply one or more of the perturbations. For example, a transformation element may apply two of the perturbations to a signal in some embodiments.

Experiments to show that the approaches disclosed herein were performed using PyTorch. One-dimensional ResNet models with exponential linear unit (ELU) activation and batch normalization were used for encoders G with different parameters for each application in the experiments. Model F (ex. the function model of the functional blocks) consisted of a 4-layer fully-connected network with 128 dimensions at each stage and 64 dimensions at the output for the experiments. Unless specified, Adam optimizer was used with a learning rate of 1e-4 for the experiments. Self-supervised learning with momentum was applied with a $k_t$ history of 24 k elements and an update momentum of 0.999 were utilized for the experiments. On an NV1DIA Tesla V100 card with 32 gigabytes (GB), this training took 47.8-54.6 hours for the EEG dataset and 33.7-39.2 hours for the ECG dataset. Linear classification using logistic regression with weight decay of 0.01 was performed to evaluate the quality of the learned embeddings. Results were reported as mean±standard deviation across 10 trials, each performed with a different random seed.

Electrical neural activity can be non-invasively recorded using electrodes placed on the scalp with EEG. Being able to derive meaningful representations from these signals will enable further understanding of the brain. However, these signals are difficult to interpret and label. Therefore, we applied the approaches described herein to the PhysioNet motor movement/imagery dataset. Data were recorded from 109 volunteers where each subject was asked to perform imagined motor tasks: closing the right fist, closing the left fist, closing both fists, and moving both feet. Each task lasted for approximately 4 seconds and was also performed with actual movement. Following previous work, data was excluded from 3 volunteers due to inconsistent timings. During the experiment, 64-channel EEG data were recorded at 160 hertz (Hz) using the BCI2000 system. Raw data was re-referenced using the channel average, and was normalized by the mean and standard deviation of the training dataset.

Encoder G (288 k parameters) was trained using self-supervised learning with data from 90 subjects. For each recording (both imagined and action trials), a time window was randomly selected as the input to G. A 256-dimensional embedding vector was produced by the encoder for every 320 samples (2 seconds (sec)). Self-supervised training was performed with a batch size of 400 and 270 k steps (or 54 k steps if only one augmentation or none was applied).

A logistic-regression linear classifier was trained on top of the frozen G model using the class labels and data from the same 90 subjects for the imagined trials only. Each example was a 2-sec window of data selected 0.25 sec after the start of each trial to account for response time after the cue. The resulting classifier and encoder G were then evaluated on 16 held-out subjects. This experimental setup is referred as inter-subject testing. Two downstream task setups were performed: (1) 2-class problem of determining imagined right fist or left fist movements based on the EEG signal, and (2) 4-class problem of determining imagined right fist, left fist, both fists, or both feet movements. Classifiers were trained using a learning rate of 1e-3 and batch size of 256 for 2 k epochs.

To understand the effectiveness of each transformation (e.g. temporal cutout, random temporal delay) and the associated parameter (e.g. temporal cutout window, maximum temporal delay), a single transformation type was applied for $T_2$ during the self-supervised training, and the identity transform was used for $T_1$. Afterwards, the learned encoder G was evaluated by training a linear classifier on top of the frozen network for the 4-class task.

Temporal cutout was the most effective transformation followed by temporal delay and signal mixing. The effect of temporal transformations was the promotion of temporal consistency where neighboring time points should be close in the embedding space and more distant time points should be farther. This finding was in agreement with previous work that considered the non-stationary property of biosignals and exploited this property with time contrastive learning. Less effective were spatial perturbations with negligible improvement (less than or equal to 0.1%) in accuracy (not shown)—likely the result of the limited spatial resolution of the EEG modality.

Figure 18:
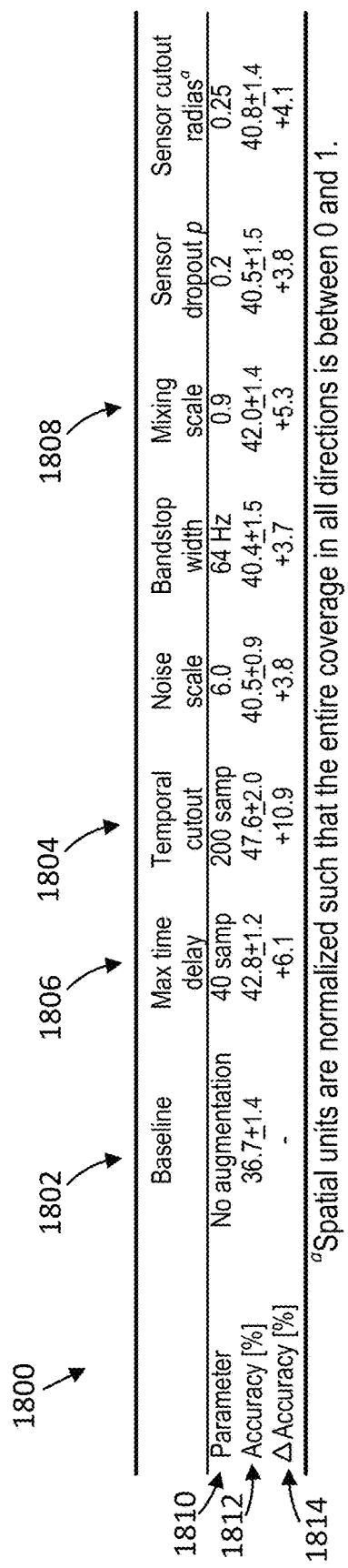
FIG. 18 illustrates a perturbation accuracy table for different classification approaches herein.

FIG. 18 illustrates a perturbation accuracy table 1800 for different classification approaches herein. In particular, the perturbation accuracy table 1800 illustrates the accuracy of the perturbations described herein that may be applied by the transformation elements (such as the transformation elements 202 (FIG. 2) and the transformation elements 302 (FIG. 3)) as part of the self-supervised training of the machine-learning model described throughout the disclosure. The perturbation accuracy table 1800 includes a baseline 1802 that includes no perturbation being applied by the transformation elements. The perturbation accuracy table 1800 has a parameter row 1810 that indicates the parameter used for each of the perturbation, an accuracy row 1812 that indicates an accuracy of the perturbation, and an accuracy change row 1814 that indicates the accuracy change versus the baseline 1802. As can be seen from the perturbation accuracy table 1800, the temporal cutout 1804 presented the best accuracy improvement followed by the temporal delay 1806 and the signal mixing 1808.

FIG. 18 provides impact of transformation type on representation learning evaluated with a linear classifier trained on top of the learned encoder for the EEG dataset. Accuracies are computed for the 4-class problem and are also shown as differences compared to the baseline of training with no augmentation (36.7%). Best parameter for each transformation is shown.

Exploiting temporal dynamics for representation learning can also be performed with Contrastive Predictive Coding (CPC) where the encoder is trained by predicting embeddings of future time points. CPC was applied to EEG using the same encoder G model. The overlap between each time segments was varied from 0 samples (0%) to 310 samples (96.9%), and the best performing setup was when the segments overlapped by 310 samples with a classification accuracy of 1.3%±1.7% below baseline of no data augmentation. This agreed with the finding that smaller temporal delays for data augmentation were more effective than larger delays. We hypothesize that the EEG signal produced by imagined motor movements occurs at a higher temporal resolution compared to the 2-sec time segments used. To apply CPC for this decoding task, the embeddings should be generated for shorter time segments (~100 milliseconds (msec)).

The impact of subject-aware training was evaluated by performing the self-supervised training with different configurations. A randomly-initialized encoder was used for comparison. Applying self-supervised learning (SSL) with no augmentation was no better than using this random encoder. For inter-subject testing, the different variants of SSL performed comparably. The training set was sufficiently large (90 subjects) to generalize to unseen subjects.

Figure 19:
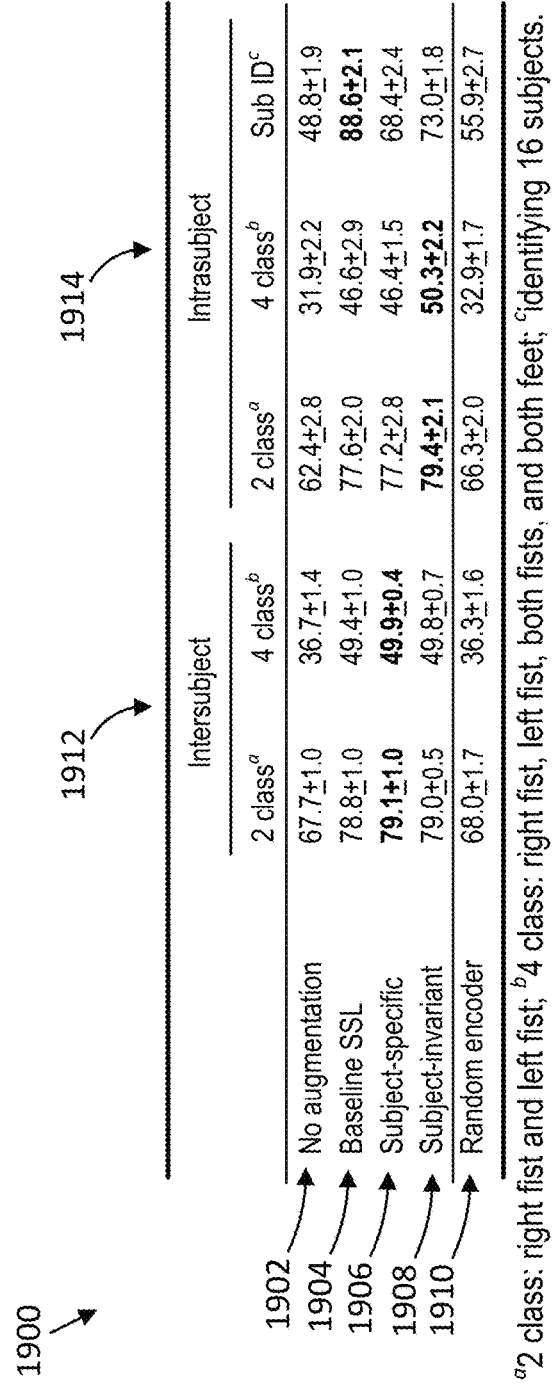
FIG. 19 illustrates a self-supervised learning accuracy table providing accuracy for some self-supervised learning approaches applied to electroencephalography (EEG).

FIG. 19 illustrates an SSL accuracy table 1900 providing accuracy for some SSL approaches applied to EEG. The accuracy table includes a classification approach with no augmentation 1902, a baseline SSL classification approach 1904, a subject-specific SSL approach 1906 in accordance with the subject-specific SSL approach disclosed herein, a subject-invariant SSL approach 1908 in accordance with the subject invariant SSL approach disclosed herein, and random encoder approach 1910. The accuracy results are provided for inter-subject classification 1912 and intra-subject classification 1914. Further, the results are provided for two classifications (right fist and left fist classifications) and four classifications (right fist, left fist, both fists, and both feet). As can be seen from the SSL accuracy table 1900, the subject-specific SSL approach 1906 provides the best accuracy for the inter-subject classifications 1912 for both the two classifications and the four classifications. The subject-invariant SSL approach 1908 provides the best accuracy for the intra-subject classifications 1914 for both the two classifications and the four classifications.

FIG. 19 provides ablation evaluation of learned EEG representation using a linear classifier with a frozen encoder. Both subject-specific and subject-invariant training decreased subject features (lower subject identification accuracies) and improved classification accuracies.

Intra-subject testing was performed where non-overlapping portions of the data from the same set of 16 subjects were used for training (75% of data) and testing (25%). The subjects that were not used for the self-supervised training were used for training and testing the linear classifier. This setup simulated the scenario where labels are available for new subjects from a calibration process. In this scenario, performance increased for the subject-invariant encoder. The greatest improvement was observed for 4 classes with 50.3% accuracy. This increase may be due to minimizing the impact of subject variability through subject invariant training.

Whether this self-supervised learning approach provided the ability to learn tasks with fewer labels was investigated. With fewer subjects to train the classifier, the subject-invariant SSL produced an encoder that was less impacted by subject variability, as seen by the performance over the baseline SSL. With enough subjects used to train the classifier, subject variability became less problematic; the training examples sufficiently covered different types of subjects to generalize to new subjects. For larger number of subjects (approximately 64), the baseline SSL performed comparably to the subject-invariant SSL. For intra-subject testing, the subject-invariant SSL consistently produced a better performing encoder compared to all other variants of SSL and supervised end-to-end learning for these 16 subjects regardless of the percentage of labels used.

The models produced from self-supervised learning were evaluated as an initialization for fine-tuning with supervised labels. A fully connected layer was attached to the last encoder layer, and this layer along with the entire encoder was fine-tuned (learning rate of 1e-5, batch size of 256, and 200 epochs). For inter-subject classification, 81.6% was achieved for 2 classes, and 53.9% was achieved for 4 classes. The increased accuracies with using self-supervised-trained models may be attributed to using more data (both action and imagined trials) for training the initial encoder. Reducing subject information in the encoder (lower classification accuracies for subject identification) provided a better initialization for the EEG motor imagery task.

Figure 20:
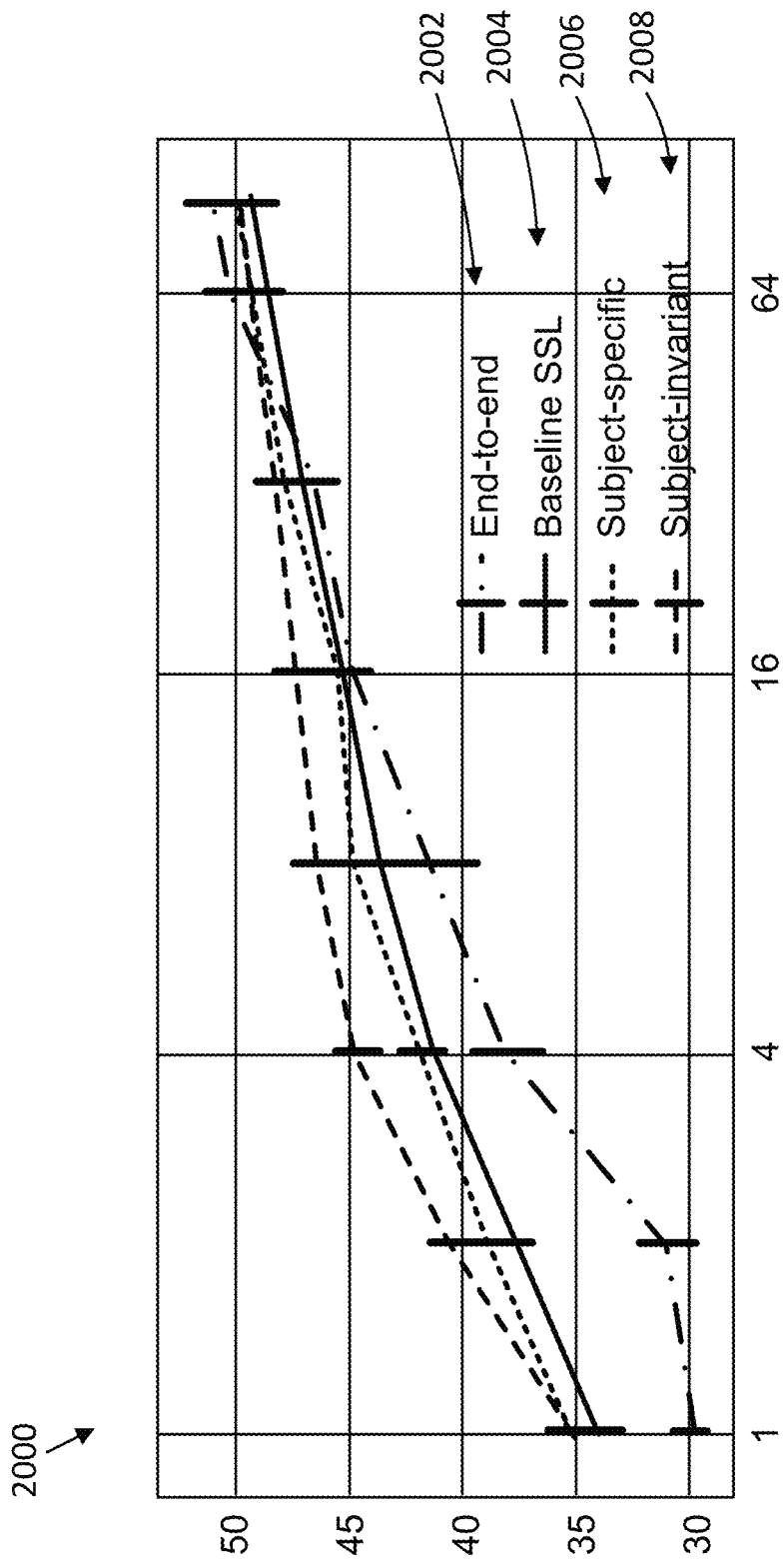
FIG. 20 illustrates a classification accuracy result chart for different classification approaches applied to electroencephalography (EEG).

FIG. 20 illustrates a classification accuracy result chart 2000 for different classification approaches applied to EEG. The classification accuracy result chart 2000 illustrates a first legacy classification approach accuracy 2002, referred to as end-to-end learning, and a second legacy classification approach accuracy 2004, referred to as baseline self-supervised learning (SSL). The classification accuracy result chart 2000 illustrates subject-specific learning accuracy 2006 corresponding to the subject-specific learning (related to the procedure 600 (FIG. 6)) disclosed herein. The classification accuracy result chart 2000 further illustrates subject-invariant learning accuracy 2008 corresponding to the subject invariant learning (related to the procedure 700 (FIG. 7)) disclosed herein. As can be seen from the classification accuracy result chart 2000, the subject-specific approach and the subject-invariant approach produces better accuracy than the legacy approaches at certain numbers of subjects.

FIG. 20 provides inter-subject testing for four classes for the EEG dataset. A linear classifier was trained on top of the frozen encoder using N subjects (x-axis) and was tested on 16 unseen subjects. Supervised end-to-end learning was used for reference. Fewer subjects were needed for self-supervised models: using labels from four subjects for subject-invariant SSL resulted in similar performance to end-to-end learning with 16 subjects.

FIG. 21 illustrates an EEG classification accuracy table 2100 for different classification approaches. The EEG classification accuracy table 2100 includes accuracy indications for a first legacy approach 2102, a second legacy approach 2104, and an end-to-end approach 2106. Further the EEG classification accuracy table 2100 includes accuracy indications for fine-tuned baseline SSL approach 2108, subject-specific approach 2110 in accordance with the subject-specific approach described herein, and subject-invariant approach 2112 in accordance with the subject-invariant approach described herein. The accuracies are provided for inter-subject 2114 and intra-subject 2116. As can be seen from the EEG classification accuracy table 2100, the subject-specific approach 2110 provides the best accuracy for the inter-subject 2114 and the subject-invariant approach 2112 provides the second best accuracy for the inter-subject 2114.

FIG. 21 provides EEG classification accuracy [%]. General representations were learned through self-supervised training, and fine-tuning from these models (last three rows) improved accuracies compared to end-to-end (ours) training from random initialization.

The approaches described herein were evaluated on ECG signals. These signals assist in the detection and characterization of cardiac anomalies on the beat-by-beat level and on the rhythm level. ECG datasets have different challenges for data-driven learning: these datasets are highly imbalanced, and features for detecting anomalies may be tied closely to the subject. The impact of the methods described herein were investigated in these situations. The MIT-B1H Arrhythmia Database was used that is commonly used to benchmark ECG beat and rhythm classification algorithms. This dataset contained 48 ambulatory ECG recordings from 47 different subjects. The 30-minute recordings from two sensor leads were digitized to 360 Hz with a bandpass filtering of 0.1-100 Hz. Signals were annotated by expert cardiologists to denote the type of cardiac beat and cardiac rhythms.

The approaches described herein were also evaluated on ECG signals. These signals assist in the detection and characterization of cardiac anomalies on the beat-by-beat level and on the rhythm level. ECG datasets have different challenges for data-driven learning: these datasets are highly imbalanced, and features for detecting anomalies may be tied closely to the subject. The impact of the methods described herein were investigated in these situations. The MIT-B1H Arrhythmia Database was used that is commonly used to benchmark ECG beat and rhythm classification algorithms. This dataset contained 48 ambulatory ECG recordings from 47 different subjects. The 30-minute recordings from two sensor leads were digitized to 360 Hz with a bandpass filtering of 0.1-100 Hz. Signals were annotated by expert cardiologists to denote the type of cardiac beat and cardiac rhythms.

Recordings were divided into a training set and testing set where the different types of beats and rhythms were evenly distributed: 22 recordings in training set, 22 recordings from different subjects in the testing set, and 4 excluded recordings due to paced beats. These four excluded recordings were included in the self-supervised learning. Cardiac beats were categorized into five classes: normal beat (training/testing samples of 45.8 k/44.2 k), supraventricular ectopic beat (SVEB) (SVEB, 0.9 k/1.8 k), ventricular ectopic beat (VEB) (VEB, 3.8 k/3.2 k), fusion beat (414/388), and unknown beat (8/7). The dataset was highly imbalanced, and thus, we followed the common practice of training a 5-class classifier and evaluating its performance in terms of classifying SVEB and VEB. To evaluate different setups, balanced accuracies were computed without the unknown beat due to too few examples for training and testing. The dataset was also labeled with rhythm annotations: normal sinus rhythm (training/testing samples of 3.3 k/2.8 k), atrial fibrillation (195/541), and other (256/362).

For an input window of 704 samples (1.96 sec), a 256-dimensional vector was produced from the encoder G (985 k parameters, model details in Appendix). The 256-dimensional vector was used directly to train a linear classifier for beat classification. For rhythm classification, 5 segments (9.78 sec) of data produced 5 vectors that were average pooled into a single vector before applying a linear classifier. Each window of ECG data x was centered by the mode $m(x)$ and normalized by $\mathbb{E}[(x-m(x))^2]^{0.5}$. A batch size of 1000 and 260 k steps were used for self-supervised training.

Different self-supervised learning setups were used to assess the impact of subject-aware training. Because subject characteristics were closely tied to the beat and rhythm classes, regularization parameter $\lambda$ for subject-invariant training was varied from 0.001 to 1.0. To evaluate the quality of the learned embeddings, a linear classifier was trained on top of the frozen encoder using cross entropy (weight decay of 0.01, learning rate of 1e-3, batch size of 256, and 1 k epochs). For rhythm classification, training data had 90% overlap for augmentation; no overlap was used for testing. Examples were randomly sampled with replacement to account for class imbalance.

Similar to EEG, subject-invariant contrastive learning produced the best performing representation for ECG beat and rhythm classification. In this case, the subject-invariant regularization $\lambda$ was lowered to 0.1 and 0.01 to maintain sufficient subject information for beat and rhythm classifications. A lower regularization was required due to the uneven distribution of labels between each subject.

FIG. 22 illustrates an ECG classification accuracy table 2200 for different classification approaches. The ECG classification accuracy table 2200 includes accuracy indications for a no augmentation approach 2202, a baseline SSL approach 2204, a subject-specific approach 2206 in accordance with the subject-specific approach described herein, and a subject-invariant approach 2208 with different regularization $\lambda$ values. The accuracies are provided for beat classification accuracy 2210, rhythm classification accuracy 2212, and subject identification accuracy 2214. As can be seen from the ECG classification accuracy table 2200, the subject-invariant approach 2208 with different regularization $\lambda$ values provide the best accuracy for beat overall accuracy and VEB F1 measurement, and for rhythm overall accuracy and atrial fibrillation (AFib) F1 measurement. In the ECG classification accuracy table 2200, SVEB refers to supraventricular ectopic beat, VEB refers to ventricular ectopic beat, AFib refers to atrial fibrillation, ID refers to subject identification, Bal Acc refers to balanced accuracy [%], Acc refers to accuracy [%], F1 refers to F1 score multiplied by 100, and ID is trained with 5 minutes of data from each subject and tested on unseen data of 22 subjects not used for SSL.

FIG. 22 provides linear classifiers to evaluate the information in the frozen encoders. Subject-invariance with minimal subject-based features performed best for classifying beats ($\lambda$=0.01) and rhythms ($\lambda$=0.001) in terms of overall balanced accuracies.

Using the self-supervised model, fewer labels may potentially be needed. The learned encoder was frozen, and a linear classifier was trained on top. To simulate collecting less data, the first N % of contiguous data from each subject was used to train the classifier. This process introduced an uneven increase in labels per class as the percentage of training data was increased as reflected by the varying model performance with respect to the percentage of training data used.

This ECG dataset was in the regime of limited number of subjects and labels which was prone to overfitting as seen in the fully supervised model trained end to end; data augmentation and MixUp were applied for end-to-end training in an attempt to mitigate overfitting. In this scenario, subject-invariant SSL was important in improving performance. For $\lambda$ of 0.1, the performance for subject-invariant SSL was comparable to the baseline SSL and subject-specific SSL up to 40% of labels and even higher with more labels. By lowering the regularization ($\lambda$ of 0.01) which increased the amount of subject-based features in the learned representations, higher accuracies were achieved.

Figure 23:
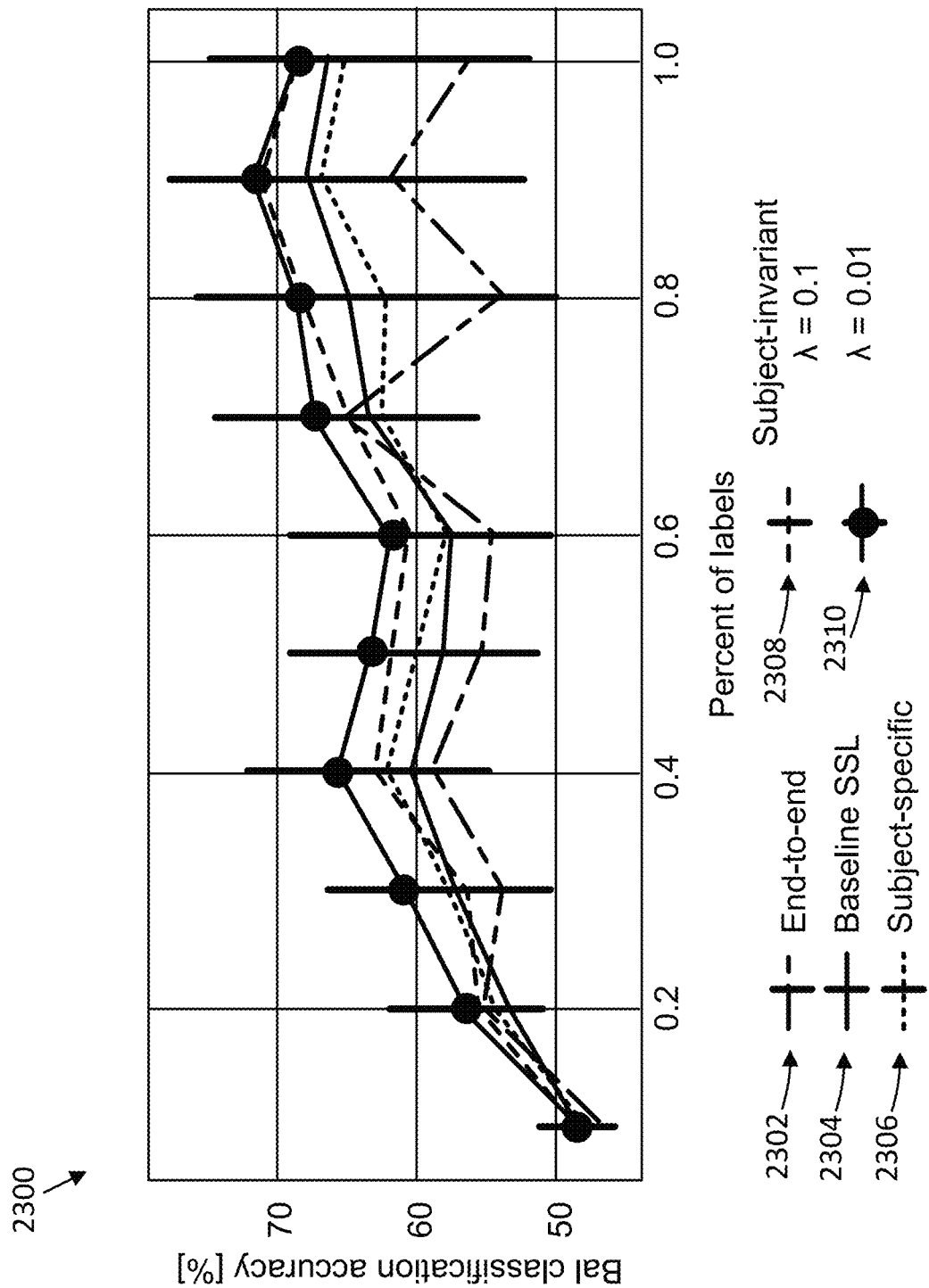
FIG. 23 illustrates a classification accuracy plot with fewer labels for electrocardiography (ECG).

FIG. 23 illustrates a classification accuracy plot 2300 with fewer labels for ECG. In particular, the classification accuracy plot 2300 shows the balanced accuracy based on the percentage of labels. The classification accuracy plot 2300 shows the accuracy for an end-to-end approach 2302, a baseline SSL approach 2304, a subject-specific approach 2306, a subject-invariant approach 2308 with a regularization value $\lambda$ of 0.1, and a subject-invariant approach 2310 with a regularization value $\lambda$ of 0.01. As can be seen from the classification accuracy plot 2300, the subject-invariant approach 2310 with the value $\lambda$ of 0.01 provided the best accuracy.

FIG. 23 provides Impact of fewer labels to train a linear classifier on top of the frozen encoders for ECG beat classification. Subject information was needed. By lowering the degree of subject-invariance ($\lambda$=0.01), accuracies were improved.

The self-supervised learned models were also evaluated as initializations for fine-tuning with supervised labels. For comparison to previous work, weighted cross-entropy was used instead of balanced resampling. An end-to-end supervised model was trained with random initialization for comparison. For beat classification, the end-to-end model achieved an overall accuracy of 91.9%±1.8%, F1 score (scaled by 100) for SVEB of 46.7, and F1 score for VEB of 89.2. These results were well within the range of previous work of 89-96% overall accuracies, 23-77 F1 for SVEB, and 63-90 F1 for VEB. Our performance improved by initializing the model with self-supervised learned weights. The best performance was observed when training from the subject-specific SSL encoder with an overall accuracy of 93.2%±1.6%, F1 score of SVEB of 43.8, and F1 score of VEB of 92.4.

The results highlight the importance of subject-awareness for learning biosignal representations. For datasets with a small number of subjects (<64 subjects for EEG), the impact of inter-subject variability can be reduced. The subject-invariant regularization can be reduced for more subjects or if subject information is important for the downstream task as seen in the analysis with the ECG dataset.

The approaches presented can be applied to other biosignals, such as signals from the eye (EOG) or muscles (EMG), which are influenced by subject-dependent characteristics. These different data streams are often simultaneously collected, and self-supervised learning with multi-modal data may be considered. These unlabeled datasets can become many folds larger than the ones explored; thus, reducing data requirements and automatically cleaning these datasets may be extensions.

The experiments mentioned showed that self-supervised learning, specifically contrastive learning, provided a solution to handle biosignals. Moreover, minimal preprocessing was required for these noisy time-series data. With the ease of collecting unlabeled biosignals, extracting meaningful representations will be critical in enabling the application of machine learning for personalizing experiences and health.

Electrophysiological sensors are widely used for monitoring, testing, and diagnosing health conditions. High accuracy and reliability are important when using machine learning for medical applications. The lack of labeled data was addressed and the biases that labeling may introduce to highly noisy time-series biosignals. However, care must be taken in collecting the unlabeled data to not bias the learning towards a particular data distribution. The use of subject-aware training mitigates this concern, but we still recommend practitioners to check for biases in the learned model. With proper care in data collection and design, the work presented here enables high quality health indicators while improving personalization and promoting privacy through minimization of subject information.

In the following sections, further example embodiments are provided.

Example 1 may include a computer-implemented method comprising accessing a training data set that includes multiple training elements, wherein each training element of the multiple training elements includes a signal, and wherein the multiple training elements are associated with one or more subjects, training a machine-learning model using the training data set, wherein the training includes identifying subject information associated with the one or more subjects from the training data set, determining contrastive loss for the training data set in view of the identified subject information, and training an encoder of the machine-learning model to move representations of training elements, of the multiple training elements, having similar characteristics closer together and move representations of training elements, of the multiple training elements, having dissimilar characteristics farther apart based on the contrastive loss, and using the trained machine-learning model to process an input signal.

Example 2 may include the computer-implemented method of example 1, further comprising removing the identified subject information from the training data set, wherein determining the contrastive loss for the training data set in view of the identified subject information includes determining the contrastive loss with the identified subject information removed from the training data set.

Example 3 may include the computer-implemented method of example 1, wherein training the machine-learning model includes training the encoder with an adversarial identifier disabled, the adversarial identifier to remove the identified subject information, fixing the encoder as trained with the adversarial identifier disabled, training the adversarial identifier with the encoder fixed as trained with the adversarial identifier disabled, fixing the adversarial identifier as trained with the encoder fixed, and retraining the encoder with the adversarial identifier fixed as trained with the encoder fixed.

Example 4 may include the computer-implemented method of example 1, wherein the encoder is a first encoder, and wherein training the machine-learning model includes training a second encoder of the machine-learning model to move representations of training elements associated with a same subject closer together and move the representations of training elements associated with different subjects farther apart based on the contrastive loss, the second encoder having momentum that causes second encoder to be trained slower than the first encoder during the training.

Example 5 may include the computer-implemented method of example 4, wherein the machine-learning model includes a first transformation element coupled between an input of the machine-learning model and an input of the first encoder, and a second transformation element coupled between the input of the machine-learning model and an input of the second encoder, and wherein the method further comprises applying, by the first transformation element, a first transformation to the training data set received at the input of the machine-learning model, and applying, by the second transformation element, a second transformation to the training data set, the second transformation being different than the first transformation, and the second transformation includes a perturbation.

Example 6 may include the computer-implemented method of example 5, wherein the perturbation includes temporal cutout, temporal delay, noise, bandstop filtering, signal mixing, spatial rotation, spatial shift, sensor dropout, or sensor cutout.

Example 7 may include the computer-implemented method of example 1, wherein the signal of each training element includes a biosignal.

Example 8 may include a computer-implemented method comprising accessing a training data set that includes multiple training elements, wherein each training element of the multiple training elements includes a signal, and wherein the multiple training elements are associated with a single subject and each training element of the multiple training elements are associated with different times, training a machine-learning model using the training data set including determining contrastive loss for the training data set having the multiple training elements associated with the single subject, and training an encoder of the machine-learning model to move representations of training elements, of the multiple training elements, associated with a same subject closer together and representations of training elements, of the multiple training elements, associated with different subject farther apart based on the contrastive loss, and using the trained machine-learning model to process an input signal.

Example 9 may include the computer-implemented method of example 8, wherein determining the contrastive loss includes including subject information related to the single subject in a negative component for determining the contrastive loss.

Example 10 may include the computer-implemented method of example 8, wherein the encoder is a first encoder, wherein the first encoder is coupled to an input of the machine-learning model, wherein the machine-learning model includes a second encoder coupled to an input of the machine-learning model, and a fully coupled layer coupled to an output of the first encoder and an output of the second encoder, and wherein determining the contrastive loss includes determining, by the fully coupled layer, the contrastive loss based on a difference between signals on the output of the first encoder and signals on the output of the second encoder.

Example 11 may include the computer-implemented method of example 10, wherein the machine-learning model further includes a transformation element coupled between the input of the machine-learning model and the second encoder, wherein the method further includes applying, by the transformation element, perturbations to signals received from the input of the machine-learning model.

Example 12 may include the computer-implemented method of example 11, wherein the signal of each of the multiple training elements is a electroencephalogram (EEG) signal, and wherein the perturbations include spatial rotations, spatial shifts, sensor dropouts, or sensor cutouts.

Example 13 may include a computer-program product tangibly embodied in one or more non-transitory machine-readable storage media, including instructions to cause a machine-learning model to access a training data set that includes multiple training elements, wherein each training element of the multiple training elements includes a signal, and wherein the multiple training elements are associated with one or more subjects, identify subject information associated with the one or more subjects from the training data set, determine contrastive loss for the training data set in view of the identified subject information, train an encoder of the machine-learning model to move representations of training elements, of the multiple training elements, having similar characteristics closer together and representations of training elements, of the multiple training elements, having dissimilar characteristics farther apart, and use the machine-learning model to process an input signal.

Example 14 may include the computer-program product of example 13, wherein the instructions are further to cause the machine-learning model to train an adversarial identifier using cross entropy loss with the encoder fixed with a certain encoding algorithm, and remove, by the adversarial identifier, the identified subject information from the training data set, wherein to determine the contrastive loss for the training data set in view of the identified subject information includes to determine the contrastive loss with the identified subject information removed from the training data set.

Example 15 may include the computer-program product of example 14, wherein to train the encoder includes to train the encoder with the adversarial identifier fixed with a certain identification model.

Example 16 may include the computer-program product of example 13, wherein the encoder is a first encoder, and wherein the instructions are further to cause the machine-learning model to apply a first transformation to the multiple training elements supplied to the first encoder, and apply a second transformation to the multiple training elements supplied to a second encoder, wherein the second transformation includes temporal cutout, temporal delay, bandstop filtering, signal mixing, spatial rotation, spatial shift, sensor dropout, or sensor cutout of the multiple training elements.

Example 17 may include the computer-program product of example 13, wherein the instructions are further to cause the machine-learning model to predict the one or more subjects from the multiple training elements of the training data set.

Example 18 may include a system, comprising one or more data processors, and a non-transitory computer-readable storage medium containing instructions which, when executed on the one or more data processors, cause the one or more data processors to access a training data set that includes multiple training elements, wherein each training element of the multiple training elements includes a signal, and wherein the multiple training elements are associated with one or more subjects, identify subject information associated with the one or more subjects from the training data set, determine contrastive loss for the training data set in view of the identified subject information, train an encoder of a machine-learning model to move representations of training elements, of the multiple training elements, having similar characteristics closer together and representations of training elements, of the multiple training elements, having dissimilar characteristics further apart based on the contrastive loss, and use the machine-learning model to process an input signal.

Example 19 may include the system of example 18, wherein instructions, when executed on the one or more data processors, further cause the one or more data processors to remove the identified subject information from the training data set, wherein to determine the contrastive loss for the training data set in view of the identified subject information includes to determine the contrastive loss with the identified subject information removed from the training data set.

Example 20 may include the system of example 18, wherein the encoder is a first encoder, and wherein the instructions, when executed on the one or more data processors, further cause the one or more data processors to train a second encoder with the training data, the second encoder implementing momentum that causes the second encoder to be trained slower than the first encoder.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred example embodiments only, and is not intended to limit the scope, applicability or configuration of the disclosure. Rather, the description of the preferred example embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
    accessing a training data set that includes multiple training elements, wherein each training element of the multiple training elements includes a signal, and wherein the multiple training elements are associated with two or more subjects;
    training a machine-learning model using the training data set, wherein the training includes:
        identifying subject information associated with the two or more subjects from the training data set;
        determining contrastive loss for the training data set in view of the identified subject information;
        training a first encoder of the machine-learning model to move representations of training elements, of the multiple training elements, having similar characteristics closer together and move representations of training elements, of the multiple training elements, having dissimilar characteristics farther apart based on the contrastive loss; and
        training a second encoder of the machine-learning model to move representations of training elements associated with a same subject closer together and move the representations of training elements associated with different subjects farther apart based on the contrastive loss, the second encoder having momentum that causes second encoder to be trained slower than the first encoder during the training; and
    using the trained machine-learning model to process an input signal.

2. The computer-implemented method of claim 1, further comprising removing the identified subject information from the training data set, wherein determining the contrastive loss for the training data set in view of the identified subject information includes determining the contrastive loss with the identified subject information removed from the training data set.

3. The computer-implemented method of claim 1, wherein training the machine-learning model includes:
    training the first encoder with an adversarial identifier disabled, the adversarial identifier to remove the identified subject information;
    fixing the first encoder as trained with the adversarial identifier disabled;
    training the adversarial identifier with the first encoder fixed as trained with the adversarial identifier disabled;
    fixing the adversarial identifier as trained with the first encoder fixed; and
    retraining the first encoder with the adversarial identifier fixed as trained with the first encoder fixed.

4. The computer-implemented method of claim 1, wherein the machine-learning model includes a first transformation element coupled between an input of the machine-learning model and an input of the first encoder, and a second transformation element coupled between the input of the machine-learning model and an input of the second encoder, and wherein the method further comprises:
    applying, by the first transformation element, a first transformation to the training data set received at the input of the machine-learning model; and applying, by the second transformation element, a second transformation to the training data set, the second transformation being different than the first transformation, and the second transformation includes a perturbation.

5. The computer-implemented method of claim 4, wherein the perturbation includes temporal cutout, temporal delay, noise, bandstop filtering, signal mixing, spatial rotation, spatial shift, sensor dropout, or sensor cutout.

6. The computer-implemented method of claim 1, wherein the signal of each training element includes a biosignal.

7. A computer-implemented method comprising:
accessing a training data set that includes multiple training elements, wherein each training element of the multiple training elements includes a signal, and wherein the multiple training elements are associated with a single subject and each training element of the multiple training elements are associated with different times;
training a machine-learning model using the training data set including:
determining, by a fully connected layer of the machine-learning model coupled to an output of a first encoder of the machine-learning model and an output of a second encoder of the machine-learning model, contrastive loss for the training data set based on a difference between signals on the output of the first encoder and signals on the output of the second encoder, the first encoder and the second encoder coupled to an input of the machine-learning model; and
training the first encoder of the machine-learning model to move representations of training elements, of the multiple training elements, having similar characteristics closer together and representations of training elements, of the multiple training elements, having dissimilar characteristics farther apart based on the contrastive loss; and
using the trained machine-learning model to process an input signal.

8. The computer-implemented method of claim 7, wherein determining the contrastive loss includes including subject information related to the single subject in a negative component for determining the contrastive loss.

9. The computer-implemented method of claim 7, wherein the machine-learning model further includes a transformation element coupled between the input of the machine-learning model and the second encoder, wherein the method further includes applying, by the transformation element, perturbations to signals received from the input of the machine-learning model.

10. The computer-implemented method of claim 9, wherein the signal of each of the multiple training elements is an electroencephalogram (EEG) signal, and wherein the perturbations include spatial rotations, spatial shifts, sensor dropouts, or sensor cutouts.

11. A computer-program product tangibly embodied in one or more non-transitory machine-readable storage media, including instructions to cause a machine-learning model to:
access a training data set that includes multiple training elements, wherein each training element of the multiple training elements includes a signal, and wherein the multiple training elements are associated with one or more subjects;
identify subject information associated with the one or more subjects from the training data set;
determine contrastive loss for the training data set in view of the identified subject information;
apply a first transformation to the multiple training elements to produce first transformed multiple elements;
train a first encoder of the machine-learning model to move representations of training elements, of the first transformed multiple training elements, having similar characteristics closer together and representations of training elements, of the first transformed multiple training elements, having dissimilar characteristics farther apart;
apply a second transformation to the multiple training elements to produce second transformed multiple elements, the second transformed multiple elements to be supplied to a second encoder, wherein the second transformation is different than the first transformation; and
use the machine-learning model to process an input signal.

12. The computer-program product of claim 11, wherein the instructions are further to:
cause the machine-learning model to train an adversarial identifier using cross entropy loss with the first encoder fixed with a certain encoding algorithm; and
remove, by the adversarial identifier, the identified subject information from the training data set, wherein to determine the contrastive loss for the training data set in view of the identified subject information includes to determine the contrastive loss with the identified subject information removed from the training data set.

13. The computer-program product of claim 12, wherein to train the first encoder includes to train the first encoder with the adversarial identifier fixed with a certain identification model.

14. The computer-program product of claim 11, wherein the second transformation includes temporal cutout, temporal delay, bandstop filtering, signal mixing, spatial rotation, spatial shift, sensor dropout, or sensor cutout of the multiple training elements.

15. The computer-program product of claim 11, wherein the instructions are further to cause the machine-learning model to predict the one or more subjects from the multiple training elements of the training data set.

16. A system, comprising:
one or more data processors; and
a non-transitory computer-readable storage medium containing instructions which, when executed on the one or more data processors, cause the one or more data processors to:
access a training data set that includes multiple training elements, wherein each training element of the multiple training elements includes a signal, and wherein the multiple training elements are associated with one or more subjects;
identify subject information associated with the one or more subjects from the training data set;
determine contrastive loss for the training data set in view of the identified subject information;
train a first encoder of a machine-learning model to move representations of training elements, of the multiple training elements, having similar characteristics closer together and representations of training elements, of the multiple training elements, having dissimilar characteristics further apart based on the contrastive loss;

train a second encoder with the training data set, the second encoder implementing momentum that causes the second encoder to be trained slower than the first encoder; and use the machine-learning model to process an input signal.

17. The system of claim 16, wherein instructions, when executed on the one or more data processors, further cause the one or more data processors to remove the identified subject information from the training data set, wherein to determine the contrastive loss for the training data set in view of the identified subject information includes to determine the contrastive loss with the identified subject information removed from the training data set.

* * * * *